(12) United States Patent
Chen

(10) Patent No.: US 7,468,758 B2
(45) Date of Patent: Dec. 23, 2008

(54) METHODS AND APPARATUS FOR DETECTING MOVEMENT IN A COMPOSITE TELEVISION SIGNAL

(75) Inventor: I-Hong Chen, Taoyuan (TW)

(73) Assignee: Mediatek Inc., Hsin-Chu (TW)

( * ) Notice: Subject to any disclaimer, the term of this patent is extended or adjusted under 35 U.S.C. 154(b) by 556 days.

(21) Appl. No.: 11/245,511

(22) Filed: Oct. 7, 2005

(65) Prior Publication Data
US 2007/0081104 A1 Apr. 12, 2007

(51) Int. Cl.
*H04N 9/78* (2006.01)
*H04N 9/64* (2006.01)

(52) U.S. Cl. ..................... 348/669; 348/701

(58) Field of Classification Search ......... 348/663–665, 348/667–670, 701, 699; *H04N 9/77, 9/78, H04N 5/14, 9/64*
See application file for complete search history.

(56) References Cited

U.S. PATENT DOCUMENTS

| | | | |
|---|---|---|---|
| 4,546,378 A | 10/1985 | Annegarn | 358/31 |
| 4,639,767 A | 1/1987 | Suzuki | 358/21 |
| 4,688,084 A | 8/1987 | Achiha | 358/36 |
| 4,794,454 A | 12/1988 | Sugiyama et al. | 358/105 |
| 4,811,092 A | 3/1989 | Achiha et al. | 358/105 |
| 4,930,012 A * | 5/1990 | Fujita | 348/666 |
| 4,972,259 A | 11/1990 | Motoe et al. | 358/105 |
| 4,979,036 A | 12/1990 | Cary Smith et al. | 358/105 |
| 5,023,713 A | 6/1991 | Nishigori | 358/105 |
| 5,032,914 A | 7/1991 | Fujita | 358/105 |
| 5,043,807 A | 8/1991 | Rabii | 358/105 |
| 5,132,790 A | 7/1992 | Niitsu | 358/105 |
| 5,373,329 A | 12/1994 | Niitsu | 348/669 |
| 5,430,500 A | 7/1995 | Hoshino et al. | 348/701 |
| 5,786,872 A | 7/1998 | Miyazaki et al. | 348/669 |
| 7,196,736 B2 * | 3/2007 | Ogawa | 348/670 |

* cited by examiner

*Primary Examiner*—Sherrie Hsia
(74) *Attorney, Agent, or Firm*—Thomas, Kayden, Horstemeyer & Risley

(57) ABSTRACT

Methods and apparatus for detecting movement in a composite television signal. A first difference signal is generated according to the difference between an $N^{th}$ frame and an $N-2^{th}$ frame of a composite television signal. A second difference signal is generated by Y/C separation of an $N^{th}$ frame and the $N-1^{th}$ frame of the composite television signal. A smooth signal is generated according to the smoothness of the $N^{th}$ frame and the $N-1^{th}$ frame of the composite television signal. The first and second difference signals are output selectively according to the smooth signal.

31 Claims, 20 Drawing Sheets

METHODS AND APPARATUS FOR DETECTING MOVEMENT IN A COMPOSITE TELEVISION SIGNAL

BACKGROUND

The invention relates to detection methods, and more particularly, to methods and apparatus for detecting motion in a composite television signal.

For a composite television signal, luminance/chrominance (Y/C) separation is a necessary process to separate luminance and chrominance signals from the composite television signal at the receiving end. The composite TV signal is sampled with four times the color sub-carrier frequency (4Fsc) and Y/C separation is then performed with the samples. For example, samples in spatial domain are utilized to perform two dimensional (2D) Y/C separation, and samples in temporal domain are utilized to perform three dimensional (3D) Y/C separation. Movement-adaptive Y/C separation is capable of performing 2D Y/C separation in the presence of rapid movement and 3D Y/C separation when the movement is considered to be slow, that is, based on movement information. Thus, movement detection is a critical part of movement-adaptive Y/C separation.

SUMMARY

Embodiments of methods for detecting movement in a composite television signal are disclosed. In the method, a first difference signal is generated according to the difference between an $N^{th}$ frame and an $N-2^{th}$ frame of a composite television signal. A second difference signal is generated by Y/C separating the $N^{th}$ frame and an $N-1^{th}$ frame of the composite television signal. A smooth signal is generated according to the smoothness of the $N^{th}$ frame and the $N-1^{th}$ frame of the composite television signal. The first and second difference signals are selectively output to serve as a movement signal according to the smooth signal.

The invention also discloses embodiments of movement detectors, in which serially-connected first and second frame memories store a composite television signal frame-by-frame and output an $N-1^{th}$ frame and an $N-2^{th}$ frame of the composite television signal respectively. A means generates a first difference signal according to the difference between an $N^{th}$ frame and the $N-2^{th}$ frame of the composite television signal. A Y/C separation unit generates a second difference signal according to the $N^{th}$ frame and the $N-1^{th}$ frame of composite television signal. A smooth detector generates a smooth signal according to the $N^{th}$ frame and the $N-1^{th}$ frame of the composite television signal. A selection unit outputs the first difference signal or the second difference signal according to the smooth signal.

The invention further discloses embodiments of signal separation apparatus for a composite television signal, in which a 2D comb filter receives a composite television signal and outputs a first luminance signal and a first chrominance signal. A 3D comb filter receives the composite television signal and outputs a second luminance signal and a second chrominance signal. The disclosed movement detector generates a movement detection signal according to the composite television signal.

DESCRIPTION OF THE DRAWINGS

The invention can be more fully understood by the subsequent detailed description and examples with reference made to the accompanying drawings, wherein.

DETAILED DESCRIPTION

For NTSC composite television (TV) signal encoding, because the phase of modulated chrominance is inverted line-by-line and frame-by-frame, the $N^{th}$ frame and the $N-2^{th}$ frame of a TV signal are in the same phase. Thus, the $N^{th}$ frame and the $N-2^{th}$ frame can be subtracted directly to obtain a difference value, thereby deriving the degree of movement of the $N^{th}$ frame and the $N-2^{th}$ frame. For NTSC composite television (TV) signal encoding, because modulated chrominance is inverted frame-by-frame, the $N^{th}$ frame and the $N-1^{th}$ frame of TV signal are out of phase. Thus, the $N^{th}$ frame and the $N-1^{th}$ frame cannot be subtracted directly to derive the degree of movement. The invention extracts luminance and chrominance from either frame by Y/C separation and derives the degree of movement between the $N^{th}$ frame and the $N-1^{th}$ frame by luminance difference or chrominance difference.

However, the accuracy of movement derived by separated luminance difference or chrominance difference in adjacent frames depends on the correctness of Y/C separation on either frame. Thus, the invention utilizes the smoothness detection to determine the accuracy of the separated luminance and chrominance. The invention uses the luminance difference or chrominance difference to derive movement information only when separated luminance and chrominance are significant.

Figure 1:
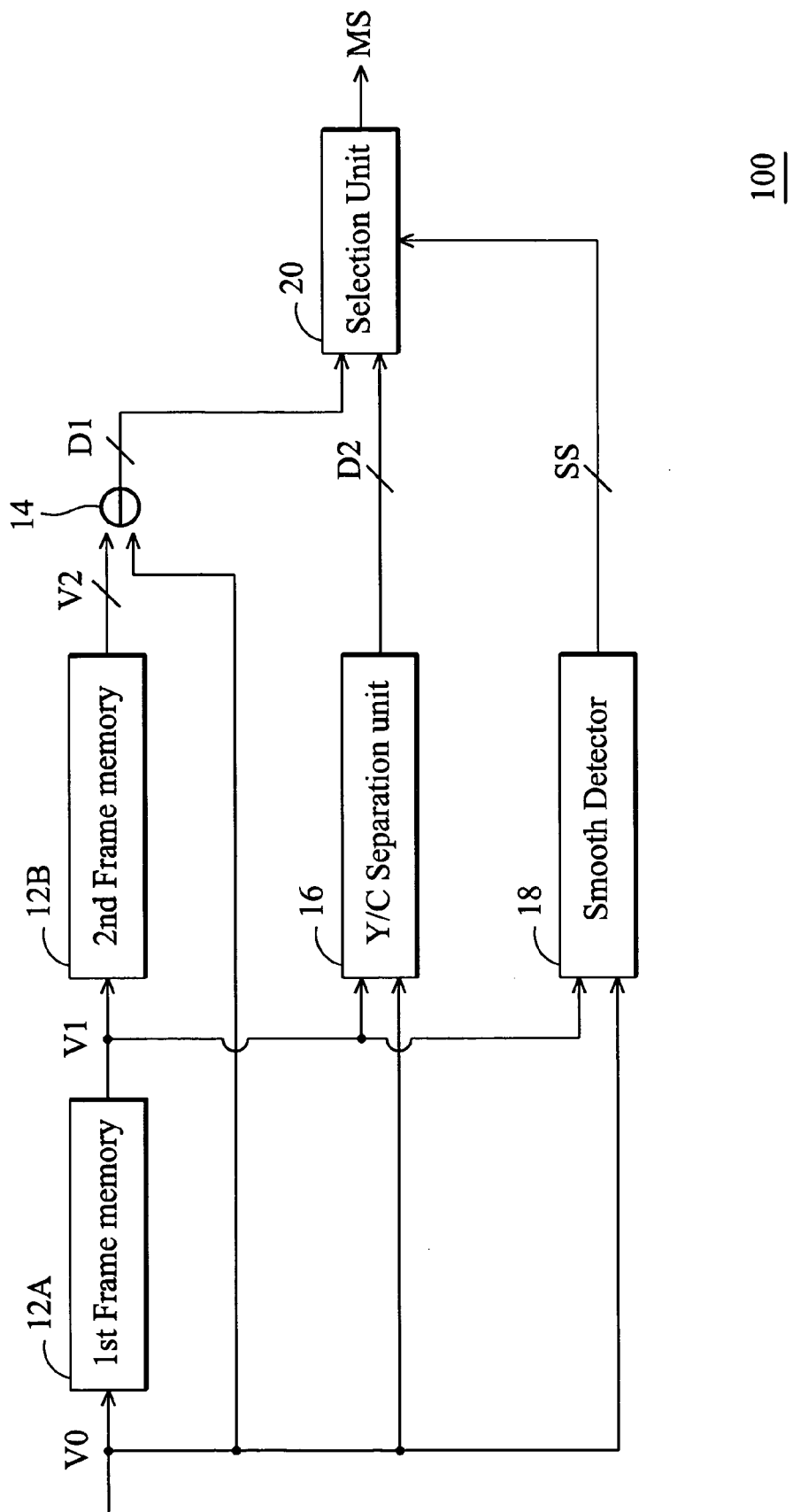
FIG. 1 is a diagram of a movement detector of the invention.

FIG. 1 is a diagram of a movement detector of the invention. As shown, the movement detector 100 comprises two frame memories 12A and 12B, a substractor 14, a luminance/chrominance (Y/C) separation unit 16, a smooth detector 18 and a selection unit 20.

The serially-connected first and second frame memories 12A and 12B store received television signals frame-by-frame and output an $N-1^{th}$ frame and an $N-2^{th}$ frame of the received composite television signal respectively. For example, the television signal supplied to the frame memories 12A can be a NTSC standard signal, converted to a digital signal of, for example, eight-bit width by sampling by an A/D circuit (not shown) at a sampling frequency (4fsc) four times that of color subcarrier. As shown, the frame memory 12A stores the current ($N^{th}$) frame V0 of the received television signal and outputs the preceding ($N-1^{th}$) frame V1 of the received television signal, and the frame memory 12B stores the (N−1$^{th}$) frame V1 and outputs the (N−2$^{th}$) frame V2 of the received television signal, in which each frame V1, V2 and V3 comprises a predetermined number of samples (not shown).

The subtractor 14 generates a first difference signal D1 according to the difference between an N$^{th}$ frame V0 and the N−2$^{th}$ frame V2 of the received composite TV signal. The Y/C separation unit 16 generates a second difference signal D2 according to the N$^{th}$ frame V0 and the N−1$^{th}$ frame V1 of the received composite television signal. The smooth detector 18 generates a smooth signal SS according to the N$^{th}$ frame V0 and the N−1$^{th}$ frame V1 of the received composite television signal. The selection unit 20 outputs the first difference signal D1 or the second difference signal D2 to serve as a movement signal MS according to the smooth signal SS.

First Embodiment

Figure 2A:
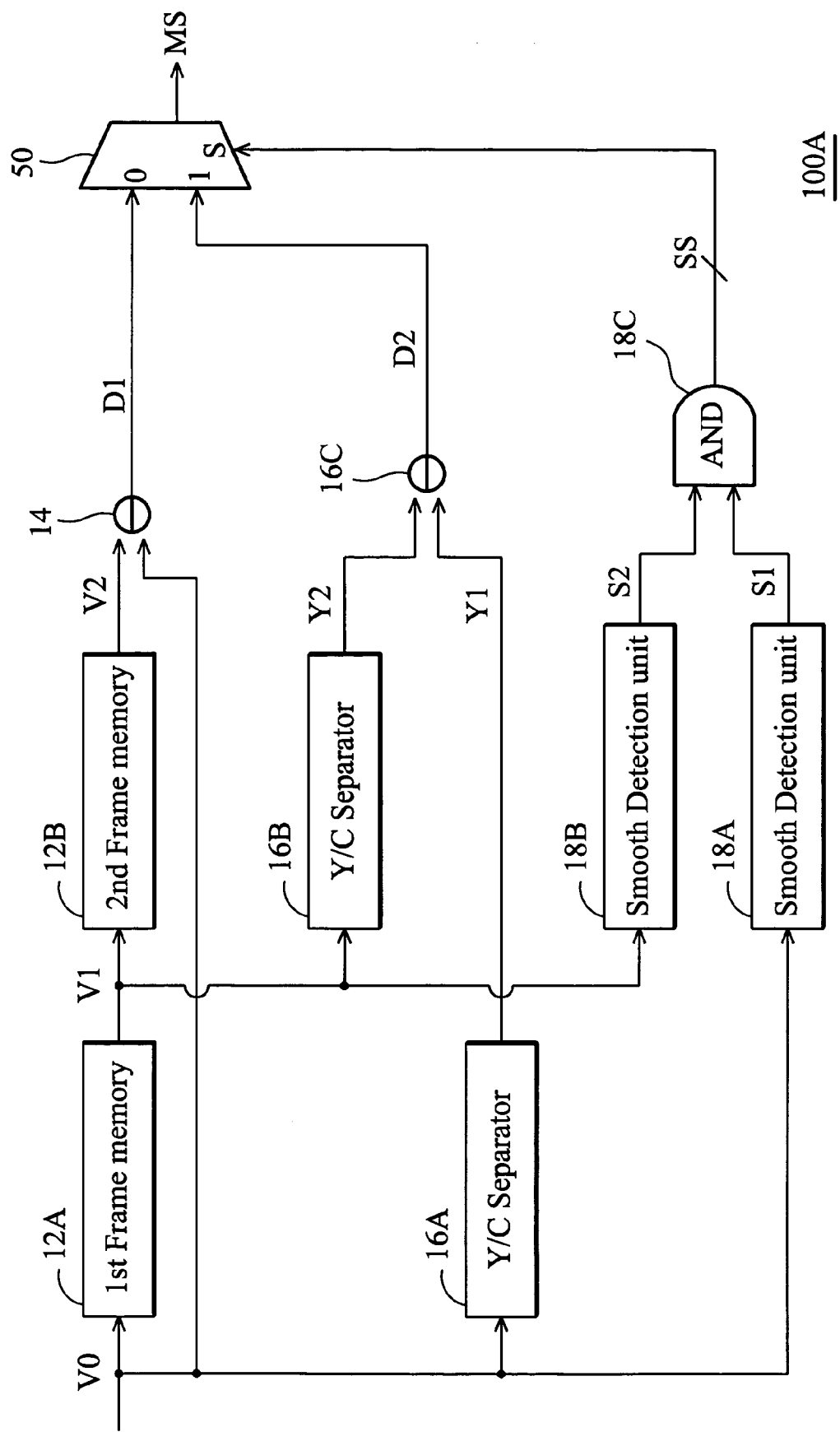
FIG. 2A shows an embodiment of the movement detector.

FIG. 2A shows an embodiment of the movement detector 100. In the movement detector 100A, the luminance/chrominance (Y/C) separation unit 16 comprises two Y/C separators 16A and 16B and a substractors 16C, the smooth detector 18 comprises two smooth detection unit 18A and 18B and an AND gate 18C. The selection unit 20 can be a multiplexer 50.

The frame memory 12A stores the current (N$^{th}$) frame V0 of the received television signal and outputs the preceding (N−1$^{th}$) frame V1 of the received television signal, and the frame memory 12B stores the (N−1$^{th}$) frame V1 and outputs the (N−2$^{th}$) frame V2 of the received television signal, in which each frame V1, V2 and V3 comprises a plurality of samples (not shown). The subtractor 14 generates the first difference signal D1 according to the difference between the N$^{th}$ frame V0 and the N−2$^{th}$ frame V2 of the received composite TV signal.

The Y/C separator 16A generates a first luminance signal Y1 according to the N$^{th}$ frame V0 of the received composite television signal. The Y/C separator 16B generates a second luminance signal Y2 according to the N−1$^{th}$ frame V1 of the received composite television signal. The subtractor 16C generates the second difference signal D2 according to the difference between the first and second luminance signals Y1 and Y2 from the Y/C separators 16A and 16B.

The smooth detection unit 18A generates a first detection signal S1 indicating the smoothness of the N$^{th}$ frame V0 of the composite television signal. The smooth detection unit 18B generates a second detection signal S2 indicating the smoothness of the N−1$^{th}$ frame V1 of the received composite television signal. The AND gate 18C outputs the smooth signal SS according to the first and second detection signals S1 and S2 from the smooth detection units 18A and 18B. The multiplexer 50 is coupled to the subtractors 14 and 16C and selectively outputs the first and second difference signals D1 and D2 according to the smooth signal SS.

For example, when the detection signal S1/S2 indicates that the smoothness of the N$^{th}$/N−1$^{th}$ frame V0/V1 of the received composite television signal is low, the correlation between samples in the frames V0/V1 is also low. Thus, the separated luminance and chrominance are not significant, and the multiplexer 50 outputs the first difference signal D1 to serve as the movement signal MS according to the smooth signal SS. On the contrary, when the detection signals S1/S2 indicate that the smoothness of the N$^{th}$/N−1$^{th}$ frame V0/V1 of the received composite television signal is high, the correlation between samples in the frames V0/V1 is also high. Thus, the separated luminance and chrominance are significant, and the multiplexer 50 outputs the second difference signal D2 to serve as the movement signal MS according to the smooth signal SS.

Second Embodiment

Figure 2B:
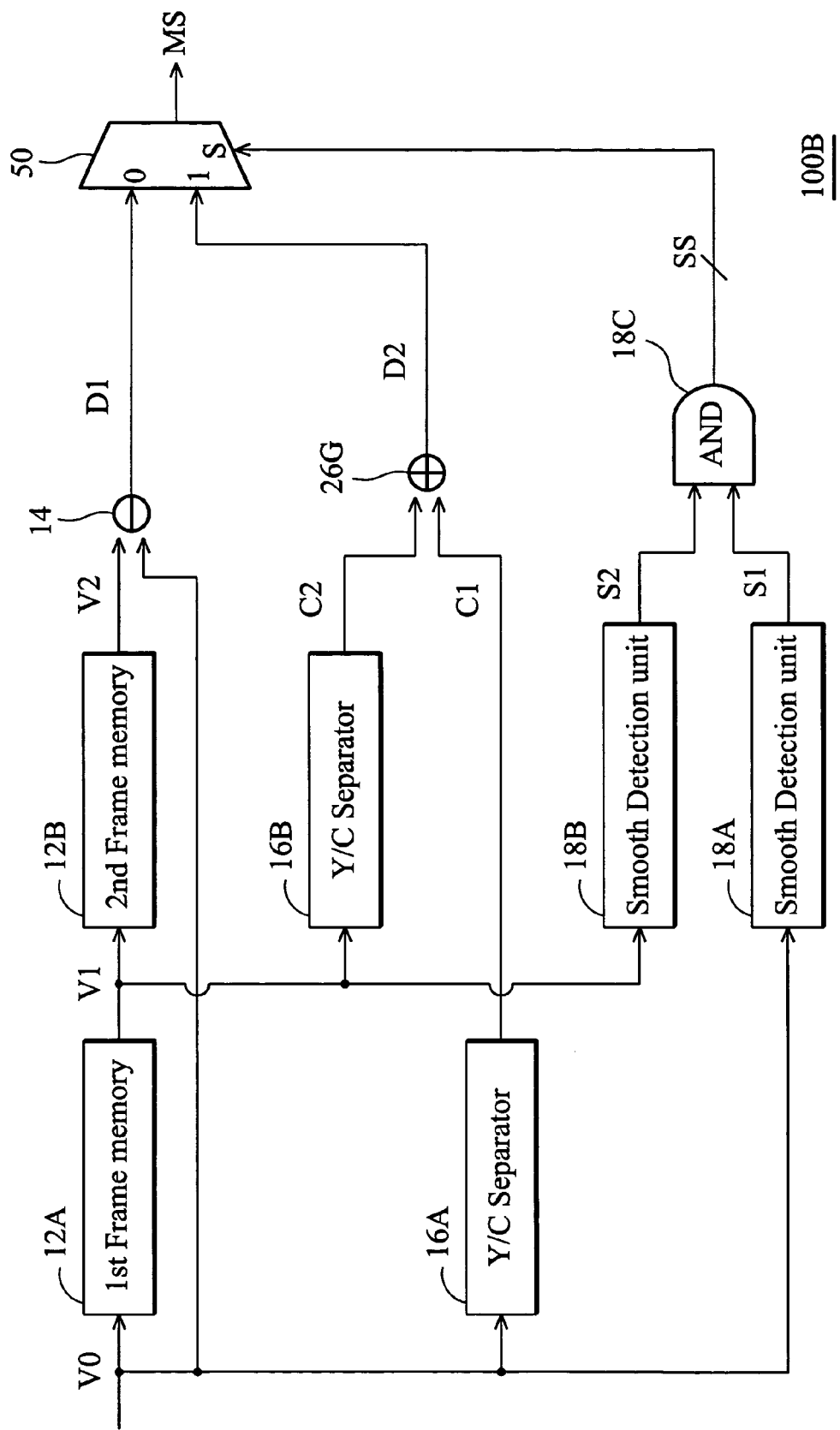
FIG. 2B shows another embodiment of the movement detector.

FIG. 2B shows another embodiment of the movement detector 100. As shown, the movement detector 100B is similar to the movement detector 100A shown in FIG. 2A, with the exception of the Y/C separators 16A and 16B and the adder 26G.

In the movement detector 100B, the Y/C separator 16A generates a first chrominance signal C1 according to the N$^{th}$ frame V0 of the received composite television signal. The Y/C separator 16B generates a second chrominance signal C2 according to the N−1$^{th}$ frame V1 of the received composite television signal. The adder 26G generates the second difference signal D2 according to the difference between the first and second chrominance signals C1 and C2 from the Y/C separators 16A and 16B. The operation of the frame memories, the smooth detector and selection unit is similar to that of the detector 100A shown in FIG. 2A, and description thereof is thus omitted for simplicity.

Third Embodiment

Figure 2C:
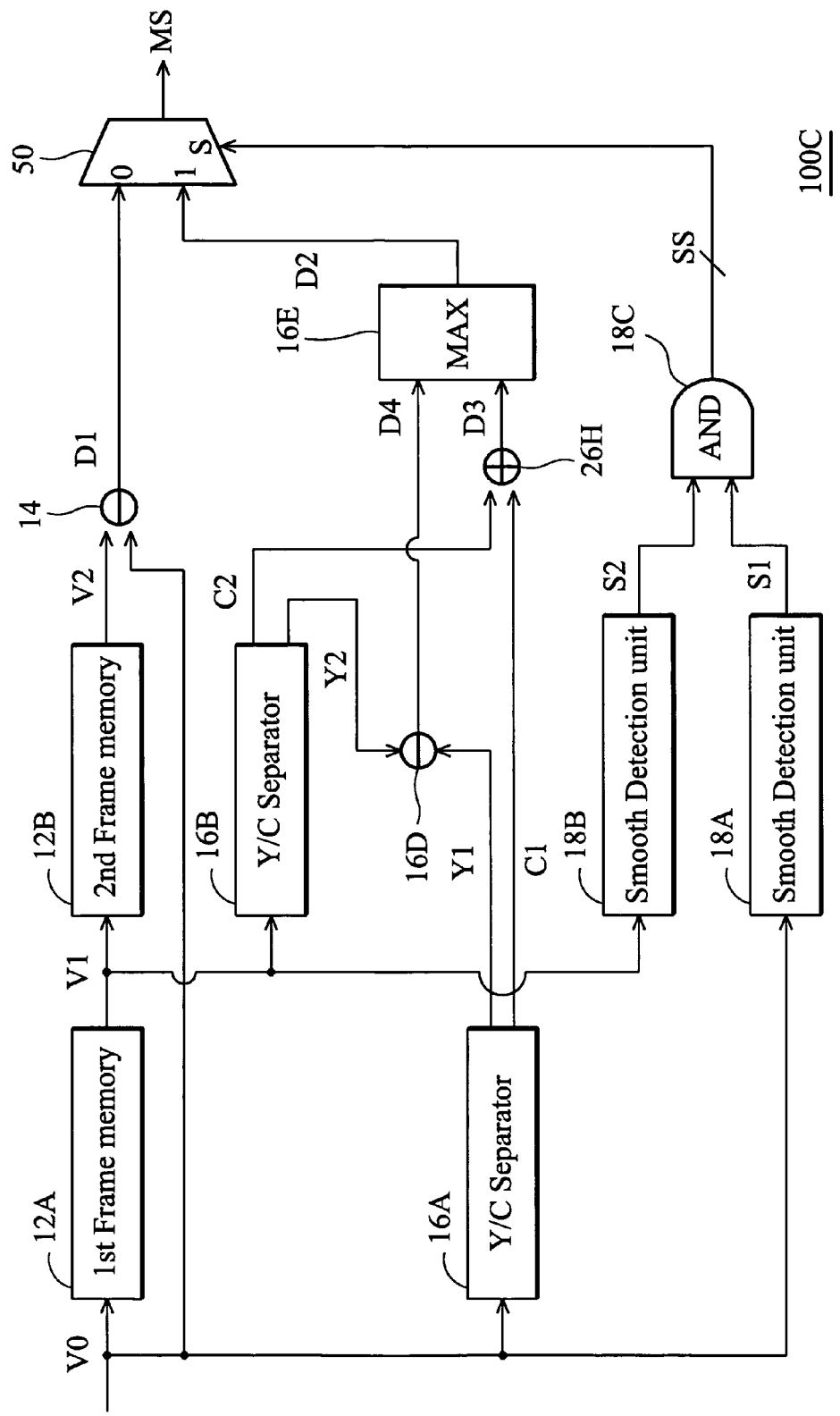
FIG. 2C shows another embodiment of the movement detector.

FIG. 2C shows another embodiment of the movement detector 100. As shown, the movement detector 100C is similar to the movement detector 100A shown in FIG. 2A, with the exception of the Y/C separators 16A and 16B, the substractors 16D, an adder 26H and a maximum selector 16E.

In the movement detector 100B, the Y/C separator 16A generates a first chrominance signal C1 and a first luminance signal Y1 according to the N$^{th}$ frame V0 of the composite television signal. The Y/C separator 16B generates a second chrominance signal C2 and a second luminance signal Y2 according to the N−1$^{th}$ frame V1 of the received composite television signal. The adder 26H generates a third difference signal D3 according to the difference between the first and second chrominance signals C1 and C2 from the Y/C separators 16A and 16B. The subtractor 16D generates a fourth difference signal D4 according to the difference between the first and second luminance signals Y1 and Y2 from the Y/C separators 16A and 16B. The maximum selector 16E selectively outputs the higher of the third and fourth difference signals D3 and D4. The operation of the frame memories, the smooth detector and selection unit is similar to that of the detector 100A shown in FIG. 2A, and description thereof is thus omitted for simplicity.

Figure 3A:
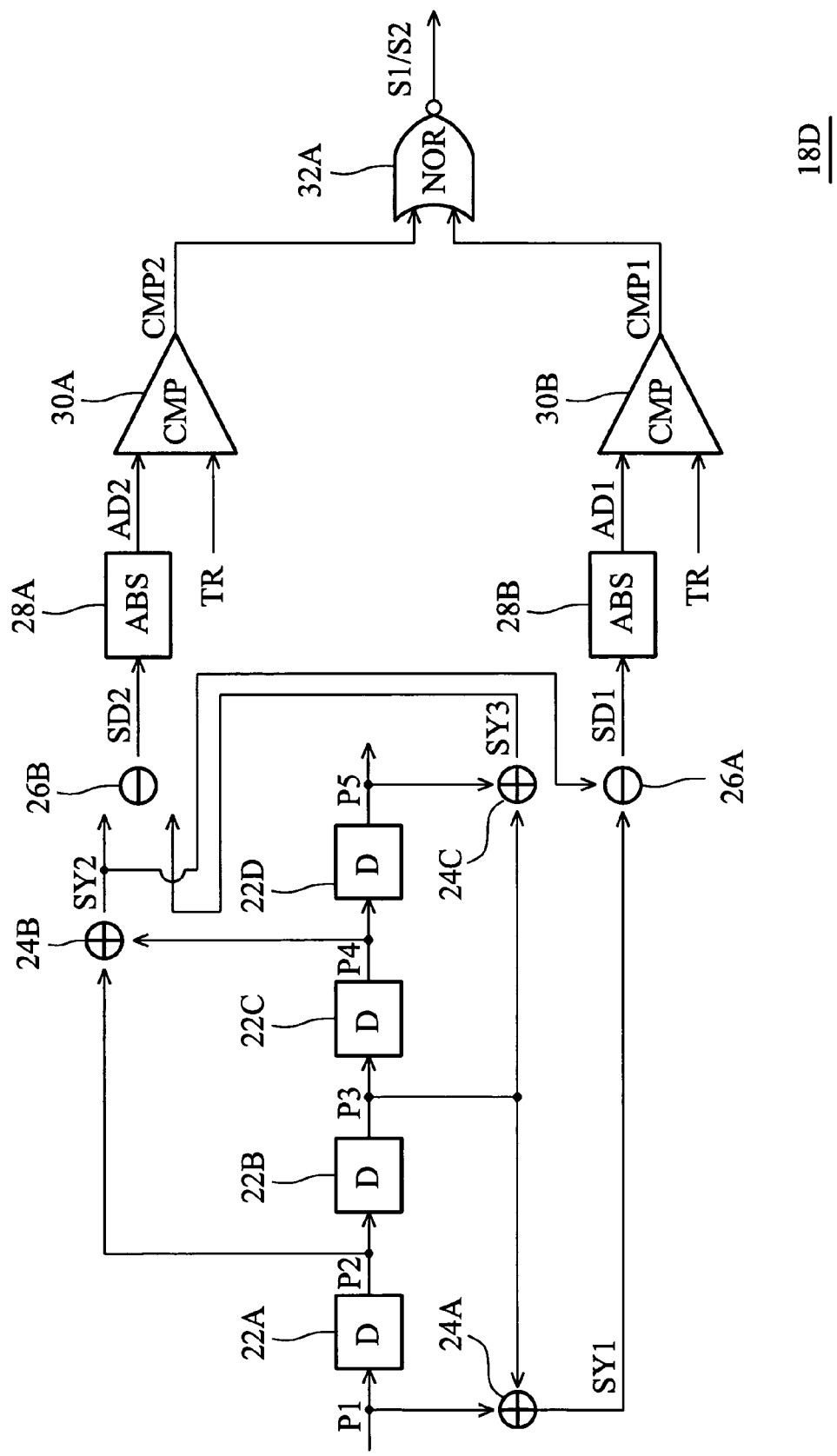
FIG. 3A shows an embodiment of the smooth detection unit.

FIG. 3A shows an embodiment of the smooth detection unit 18A/18B shown in FIGS. 2A~2C.

As shown, the smooth detection unit 18D comprises series-connected delay elements 22A-22D, three adders 24A-24C, two subtractors 26A and 26B, two absolute value circuits 28A and 28B, two comparators 30A and 30B and an NOR gate 32A.

The serially-connected delay elements 22A-22D each stores a sample of the received television signals sampled at a sampling frequency (4fsc) four times that of color subcarrier and outputs a delayed sample P2-P5 respectively. For example, the delay element 22A delays the sample P1 by a sample clock cycle and outputs the delayed simple P2, and the delay element 22B delays the sample P2 by a sample clock cycle and outputs the delayed simple P3, and so on.

The adder 24A outputs a luminance difference signal Sy1 according to the samples P1 and P3, the adder 24B outputs a luminance difference signal SY2 according to the samples P2 and P4, and the adder 24C outputs a luminance difference signal SY3 according to the samples P3 and P5. The subtractor 26A outputs a difference signal SD1 according to the luminance difference signals SY1 and SY2, and the subtractor 26B outputs a difference signal SD2 according to the luminance difference signals SY2 and SY3. The absolute value circuits 28A and 28B generate a first level value AD1 and a second level value AD2 according to the difference signal SD1 and SD2.

The comparator 30A compares the first level value AD1 with a threshold value TR and outputs a comparison signal CMP1 of high level when the first level value AD1 exceeds the threshold value TR. Similarly, the comparator 30B compares the second level value AD2 with the threshold value TR and outputs a comparison signal CMP2 of high level when the second level value AD2 exceeds the threshold value TR. The NOR gate 32A generates the detection signal S1/S2 according to the comparison signals CMP1 and CMP2. For example, the NOR gate 32A outputs a detection signal S1/S2 indicating the smoothness of the composite television signal is low when receiving the high level comparison signals CMP1 or CMP2.

Figure 3B:
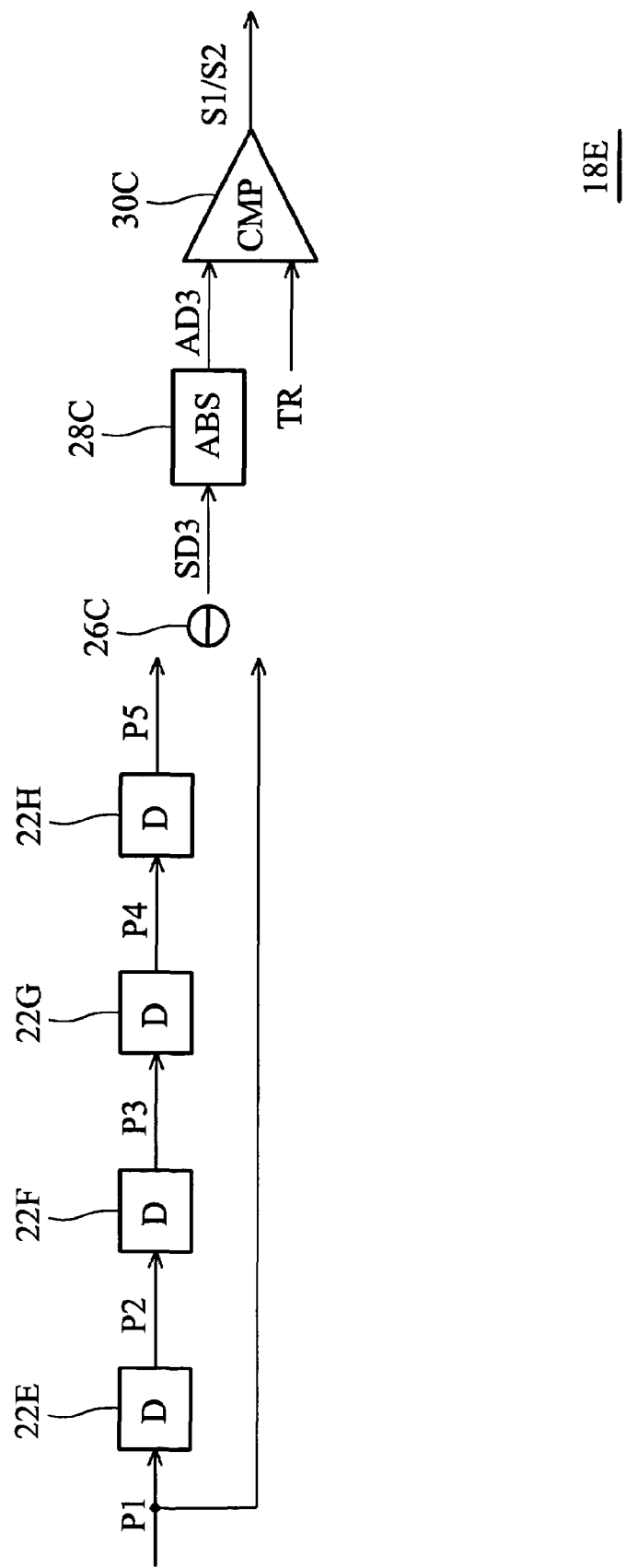
FIG. 3B shows another embodiment of the smooth detection unit.

FIG. 3B shows another embodiment of the smooth detection unit 18A/18B. As shown, the smooth detection unit 18E comprises series-connected delay elements 22E-22H, a subtractor 26C, an absolute value circuit 28C, and a comparator 30C. The serially-connected delay elements 22E-22H are similar to those delay elements 22A-22D shown in FIG. 3A. The subtractor 26C outputs a difference signal SD3 according to the difference between the samples P1 and P5. The absolute value circuit 28C generates a level value AD3 according to the difference signal SD3. The comparator 30C compares the level value AD3 with a threshold value TR and outputs the detection signal S1/S2 of low level when the level value AD3 exceeds the threshold value TR.

Figure 3C:
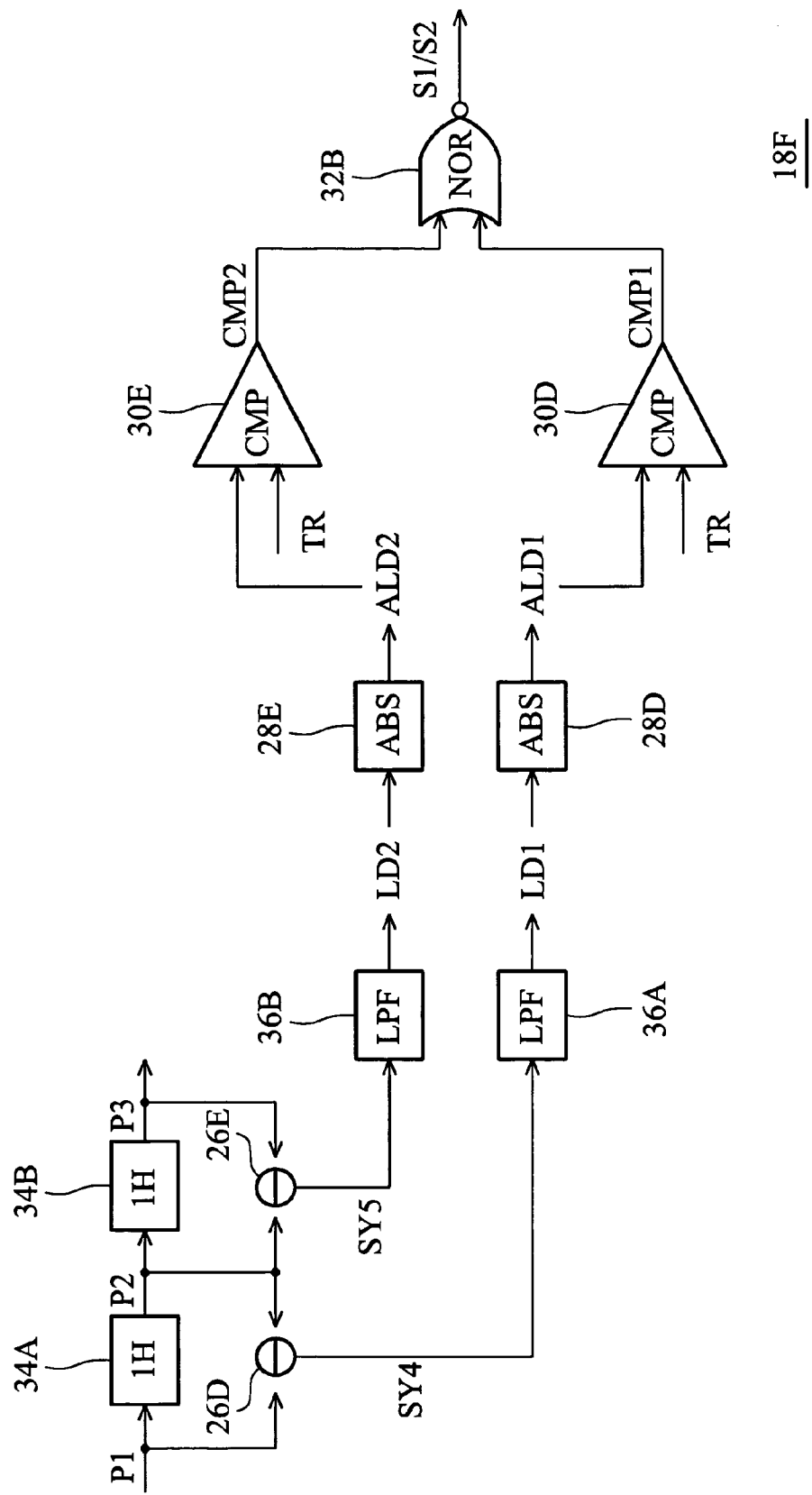
FIG. 3C shows another embodiment of the smooth detection unit.

FIG. 3C shows another embodiment of the smooth detection unit 18A/18B. As shown, the smooth detection unit 18F comprises series-connected line delay elements 34A and 34B, two subtractors 26D and 26E, two low pass filters 36A and 36B, two absolute value circuits 28D and 28E, two comparators 30D and 30E, and an NOR gate 32B.

The serially-connected line delay elements 34A and 34B delay the received sample line-by-line. For example, the line delay element 34A delays the sample P1 and outputs the delayed simple P2, and the delay element 22B delays the sample P2 and outputs the delayed simple P3. The subtractor 26D outputs a difference signal SY4 according to the samples P1 and P2, and the subtractor 26E outputs a difference signal SY5 according to the samples P2 and P3. The low pass filters 36A and 36B filter chrominance component from the difference signals SY4 and SY5 respectively to obtain luminance difference signals LD1 and LD2.

The absolute value circuits 28D and 28E generate a first luminance value ALD1 and a second luminance value ALD2 according to the luminance difference signals LD1 and LD2 respectively. The comparator 30D compares the first luminance value ALD1 with a threshold value TR and outputs a comparison signal CMP1 of high level when the first luminance value ALD1 exceeds the threshold value TR. Similarly, the comparator 30B compares the second luminance value ALD2 with the threshold value TR and outputs a comparison signal CMP2 of high level when the second luminance value ALD2 exceeds the threshold value TR. The NOR gate 32B generates the detection signal S1/S2 according to the comparison signals CMP1 and CMP2. For example, the NOR gate 32B outputs a detection signal S1/S2 indicating the smoothness of the composite television signal is low when receiving the high level comparison signals CMP1 or CMP2.

Figure 3D:
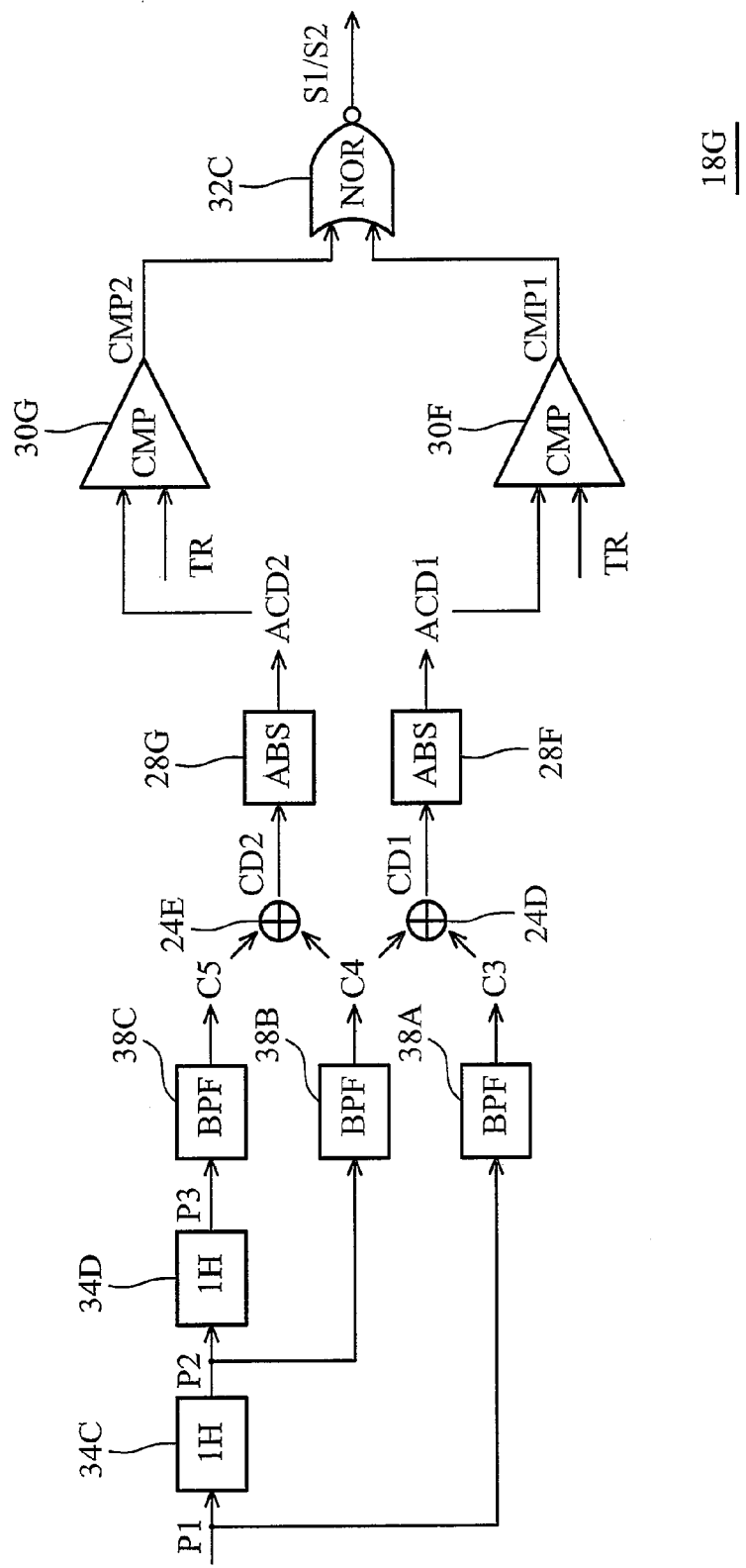
FIG. 3D shows another embodiment of the smooth detection unit.

FIG. 3D shows another embodiment of the smooth detection unit 18A/18B. As shown, the smooth detection unit 18G comprises series-connected line delay elements 34C and 34D, three band-pass filters 38A, 38B and 36C, two adders 24D and 24E, two absolute value circuits 28F and 28G, two comparators 30F and 30G, and an NOR gate 32C.

The serially-connected delay elements 34C and 34D are similar to the delay elements 34A and 34B shown in FIG. 3C. The band-pass filters 38A, 38B and 38C filter the luminance component from the samples P1, P2 and P3 respectively to obtain chrominance signals C3, C4 and C5. The adder 24D outputs a difference signal CD1 according to the difference between the chrominance signals C3 and C4. The adder 24E outputs a difference signal CD2 according to the difference between the chrominance signals C4 and C5.

The absolute value circuits 28F and 28G generate a first chrominance value ACD1 and a second chrominance value ACD2 according to the chrominance difference signals CD1 and CD2 respectively. The comparator 30F compares the first chrominance value ACD1 with a threshold value TR and outputs a comparison signal CMP1 of high level when the first chrominance value ACD1 exceeds the threshold value TR. Similarly, the comparator 30G compares the second chrominance value ACD2 with the threshold value TR and outputs a comparison signal CMP2 of high level when the second chrominance value ACD2 exceeds the threshold value TR. The NOR gate 32C generates the detection signal S1/S2 according to the comparison signals CMP1 and CMP2.

Figure 4A:
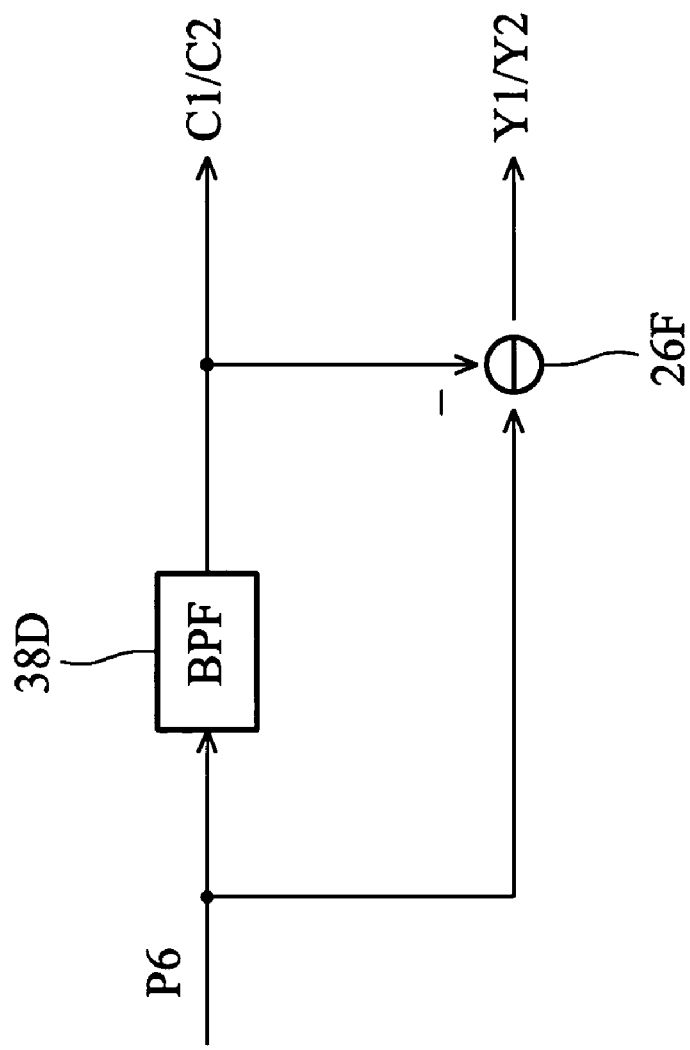
FIG. 4A shows an embodiment of the Y/C separator.

FIG. 4A shows an embodiment of the Y/C separator 16A/16B shown in FIGS. 2A~2C. As shown, the Y/C separator 16D comprises a band-pass filter 38D and a subtractor 26F. The band-pass filter 38D filters the luminance component from the samples P6 of the received television signal to obtain the chrominance signal C1/C2. The subtractor 26F subtracts the chrominance signal C1/C2 from the samples P6 of the received television signal to obtain the luminance signal Y1/Y2.

Figure 4B:
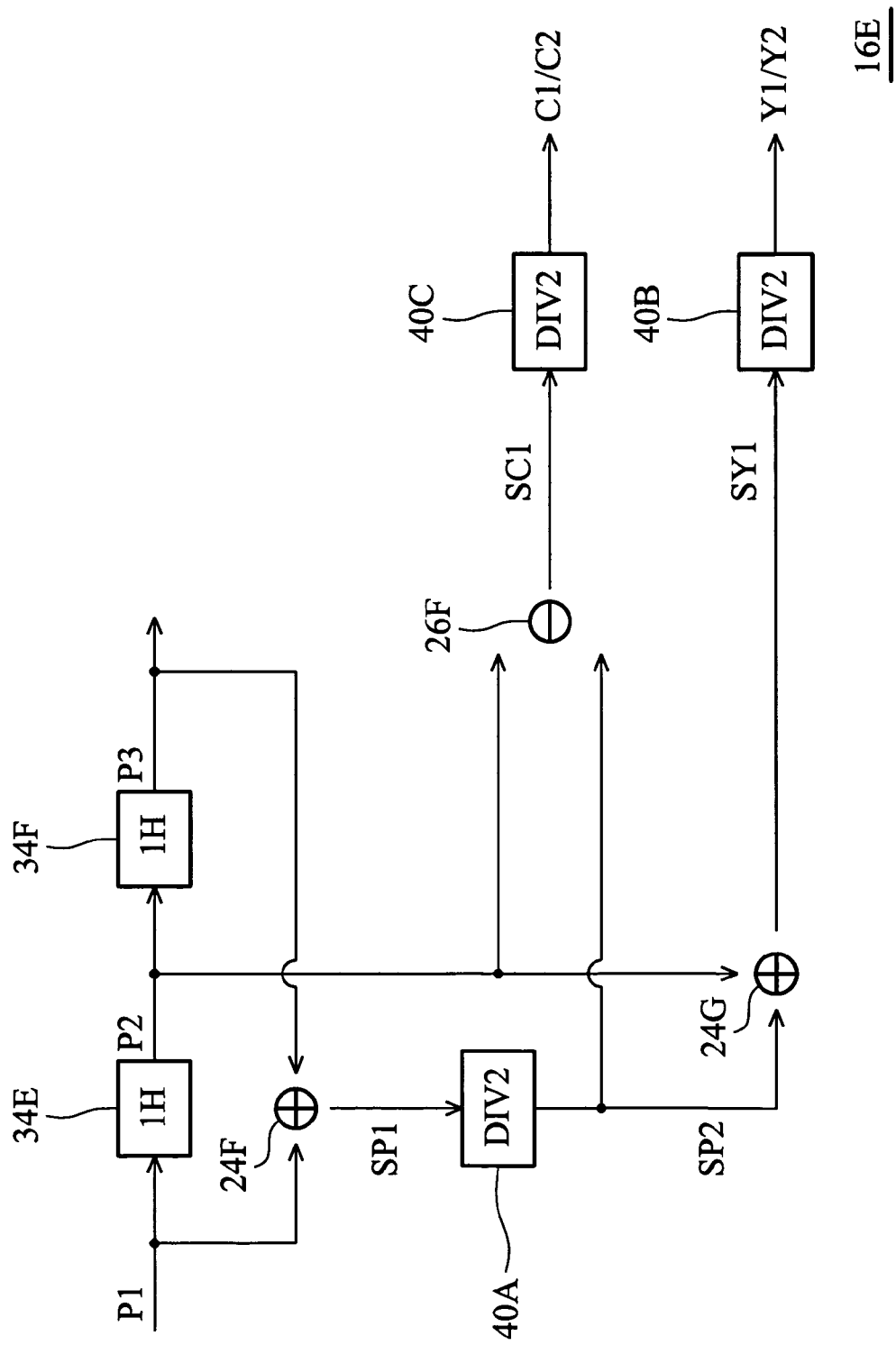
FIG. 4B shows another embodiment of the Y/C separator.

FIG. 4B shows another embodiment of the Y/C separator 16A/16B. As shown, the Y/C separator 16E comprises series-connected line delay elements 34E and 34F, two adders 24F and 24G, three division circuits 40A-40C, and a subtractor 26F.

The serially-connected delay elements 34E and 34F are similar to the delay elements 34A and 34B shown in FIG. 3C.

The adder 34F adds the samples P1 and P3 to obtain a first signal SP1, and the division circuit 40A divides the first signal SP1 by 2 to obtain a second signal SP2. The adder 24G adds the second signal SP2 to the sample P2 to output a luminance signal SY1, and the subtractor 26F subtracts the signal SP2 from the sample P2 to obtain a chrominance signal SC1. The division circuit 40B divides the luminance signal SY1 by 2 to serve as the separated luminance signal Y1/Y2, and the division circuit 40C divides the chrominance signal SC1 by 2 to serve as the separated chrominance signal C1/C2.

FIGS. 5A-5H show other embodiments of the movement detector 100.

Figure 5A:
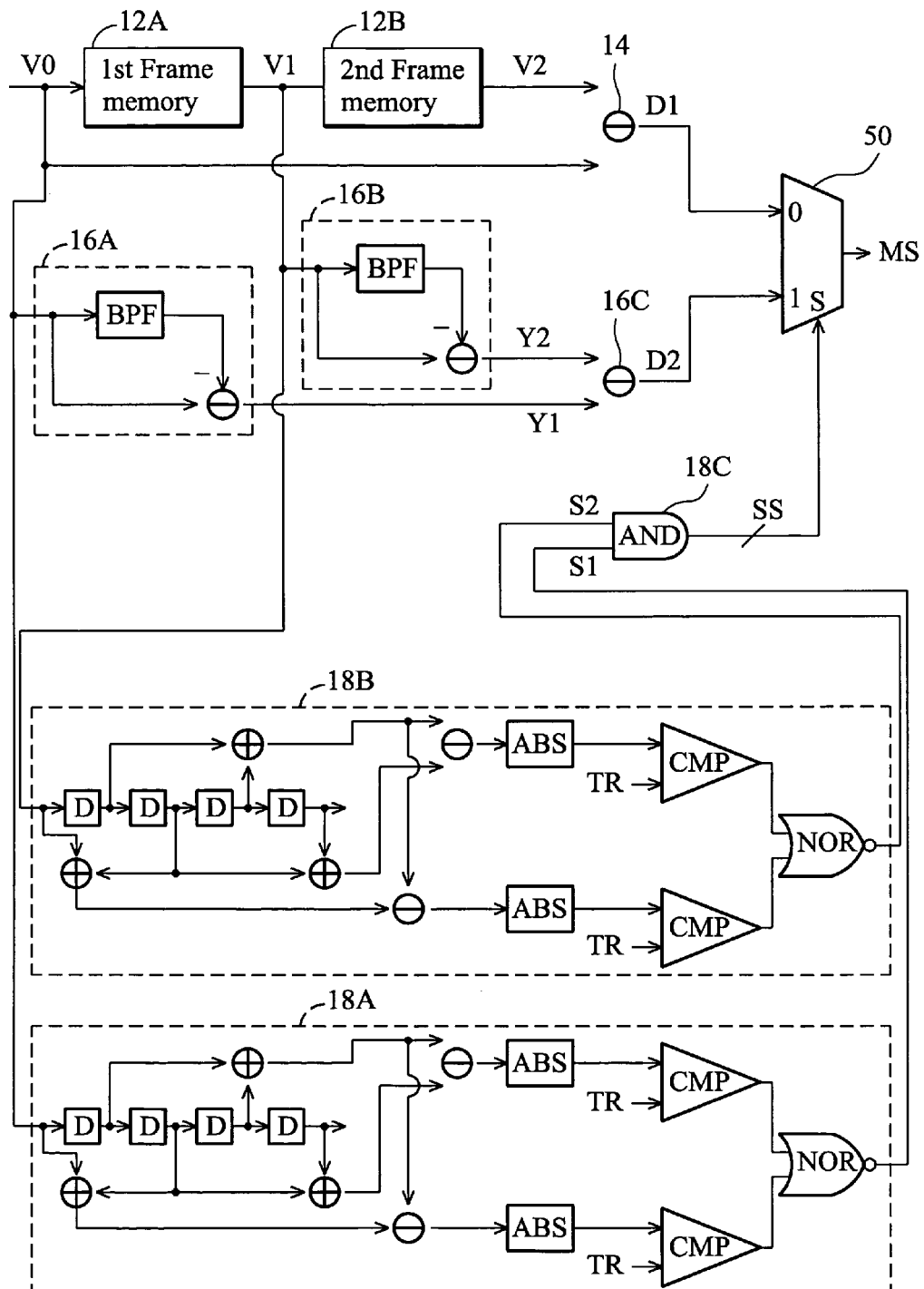
FIGS. 5A-5H show other embodiments of the movement detector.

In the movement detector 100D shown in FIG. 5A, the serially-connected first and second frame memories 12A and 12B store received television signals frame-by-frame and output an N−$1^{th}$ frame V1 and an N−$2^{th}$ frame V2 of the received composite television signal respectively. The subtractor 14 generates a first difference signal D1 according to the difference between an $N^{th}$ frame V0 and the N−$2^{th}$ frame V2 of the received composite TV signal.

The Y/C separators 16A and 16B are each implemented by the Y/C separator 16D shown in FIG. 4A. The Y/C separators 16A and 16B generate the first and second luminance signals Y1 and Y2 according to the $N^{th}$ frame V0 and the $N-1^{th}$ frame V1 of the received composite television signal respectively. The subtractor 16C generates the second difference signal D2 according to the difference between the first and second luminance signals Y1 and Y2 from the Y/C separators 16A and 16B.

The smooth detection units 18A and 18B are each implemented by the smooth detection unit 18D shown in FIG. 3A. The smooth detection units 18A and 18B generate a first detection signal S1 indicating the smoothness of the $N^{th}$ frame V0 of the composite television signal and a second detection signal S2 indicating the smoothness of the $N-1^{th}$ frame V1 of the received composite television signal. The AND gate 18C outputs the smooth signal SS according to the first and second detection signals S1 and S2. The multiplexer 50 outputs the first difference signal D1 or the second difference signal D2 to serve as the movement signal MS according to the smooth signal SS.

Figure 5B:
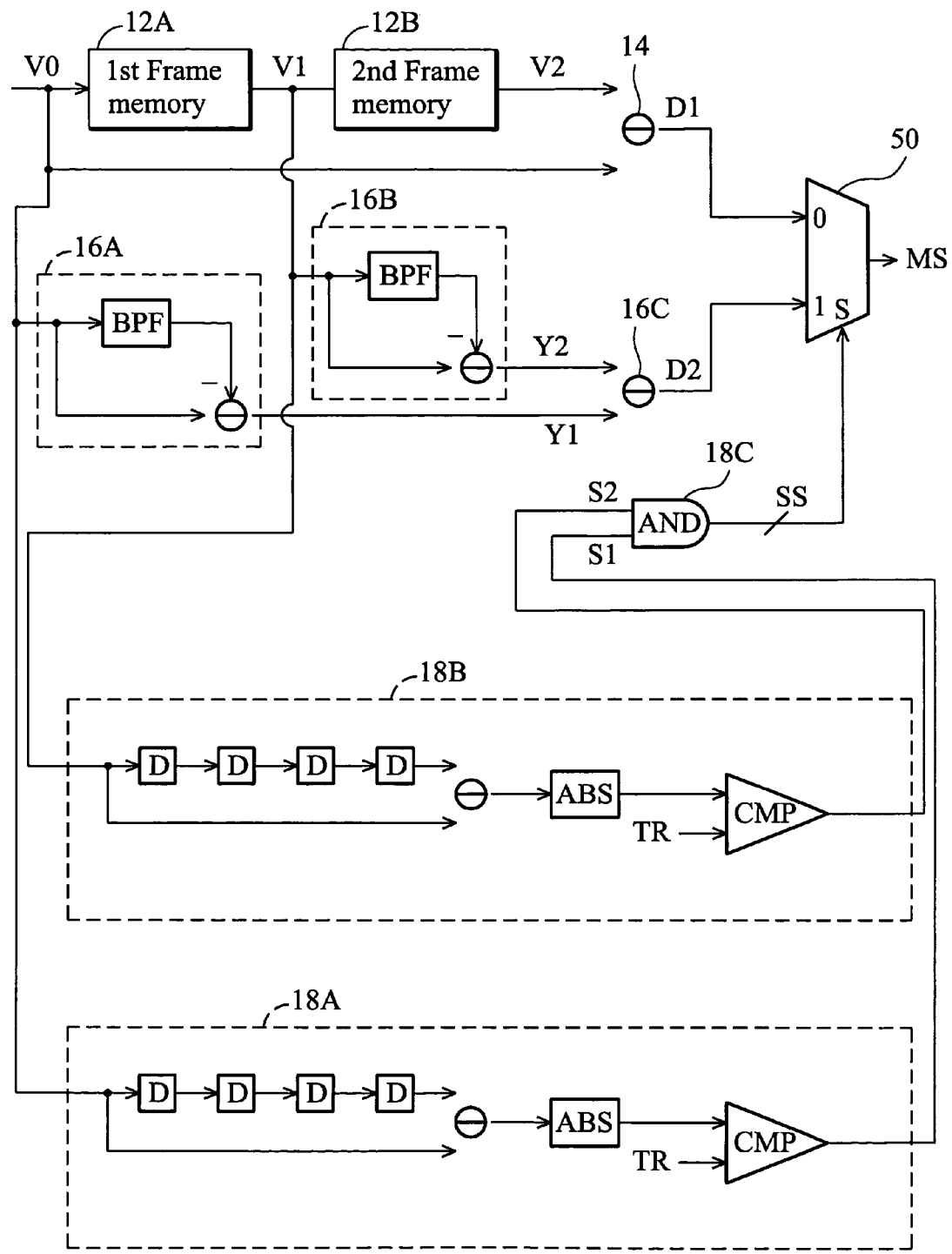

The movement detector 100E shown in FIG. 5B is similar to the movement detector 100D shown in FIG. 5A, with the exception of the smooth detection units 18A and 18B each being implemented by the smooth detection unit 18E shown in FIG. 3B.

Figure 5C:
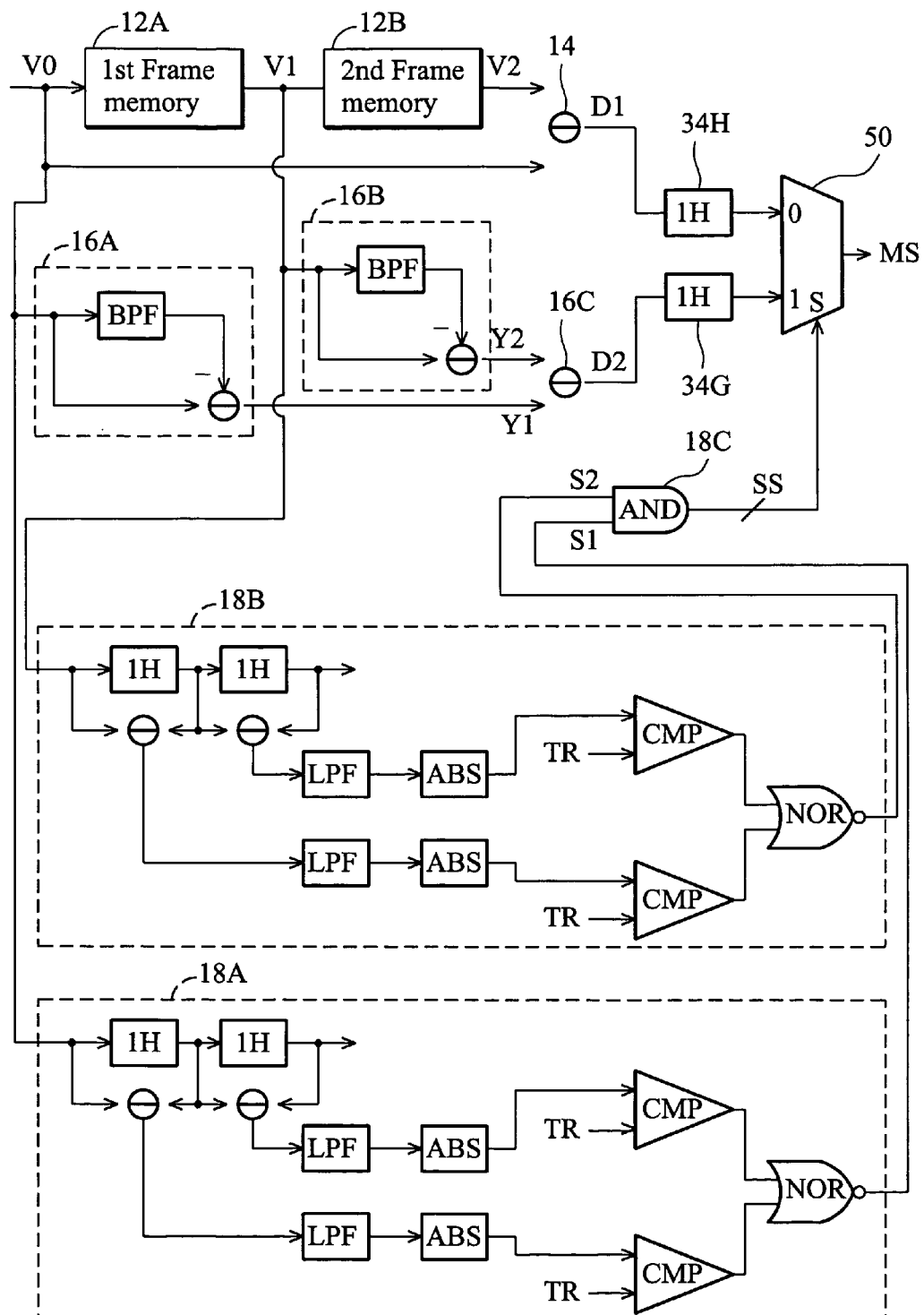

The movement detector 100F shown in FIG. 5C is similar to the movement detector 100D shown in FIG. 5A, with the exception of the smooth detection units 18A and 18B each being implemented by the smooth detection unit 18F shown in FIG. 3C and the line delay elements 34G and 34H. The line delay elements 34G and 34H delay the difference signals D1 and D2 to match the smooth signal SS from the smooth detector.

Figure 5D:
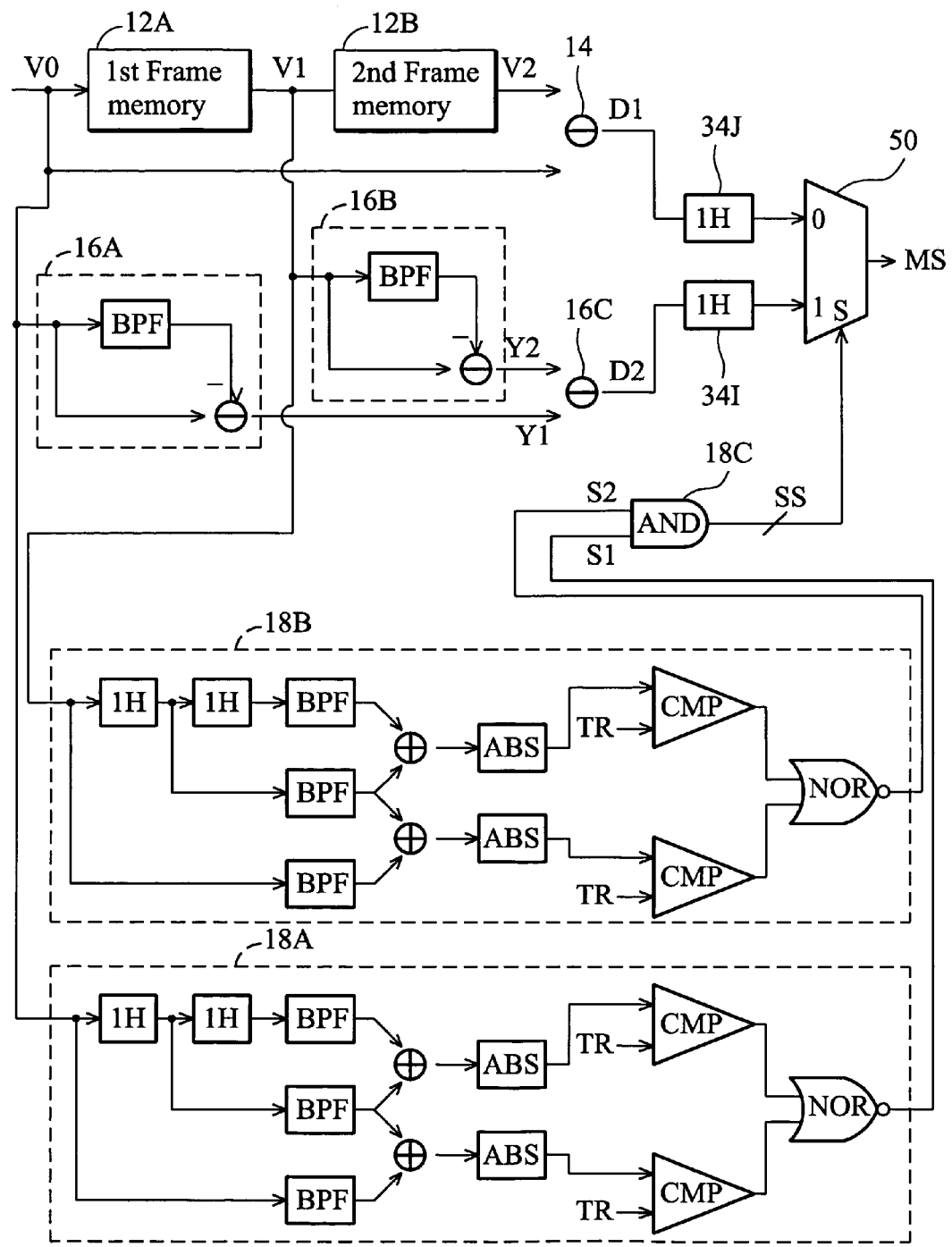

The movement detector 100G shown in FIG. 5D is similar to the movement detector 100F shown in FIG. 5C, with the exception of the smooth detection units 18A and 18B each being implemented by the smooth detection unit 18G shown in FIG. 3D.

Figure 5E:
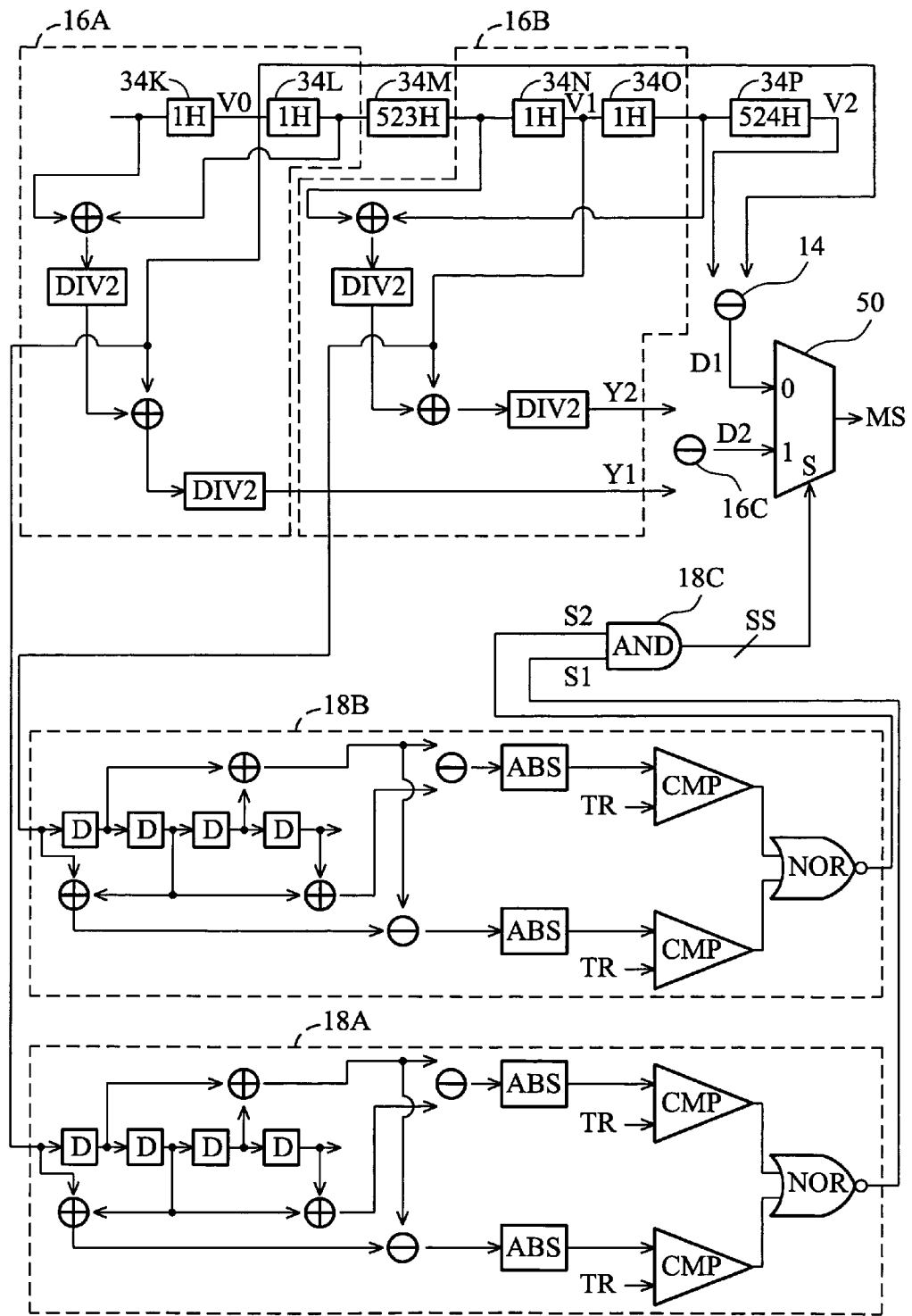

The movement detector 100H shown in FIG. 5E is similar to the movement detector 100D shown in FIG. 5A, with the exception of the Y/C separators 16A and 16B each being implemented by the Y/C separator 16E shown in FIG. 4B and the frame memories 12A and 12B implemented by the line delay elements 34L-34P. The Y/C separators 16A and 16B generate the first and second luminance signals Y1 and Y2 according to the $N^{th}$ frame V0 and the $N-1^{th}$ frame V1 of the received composite television signal respectively. The subtractor 16C generates the second difference signal D2 according to the difference between the first and second luminance signals Y1 and Y2 from the Y/C separators 16A and 16B. In this embodiment, the frame memory 12A is implemented by the line delay elements 34L, 34M and 34N, and the frame memory 12B is implemented by the line delay elements 34O and 34P. Namely, the frame memory 12A and the Y/C separator 16A share the line delay element 34L, and the frame memory 12B and the Y/C separator 16B share the line delay element 34O.

Figure 5F:
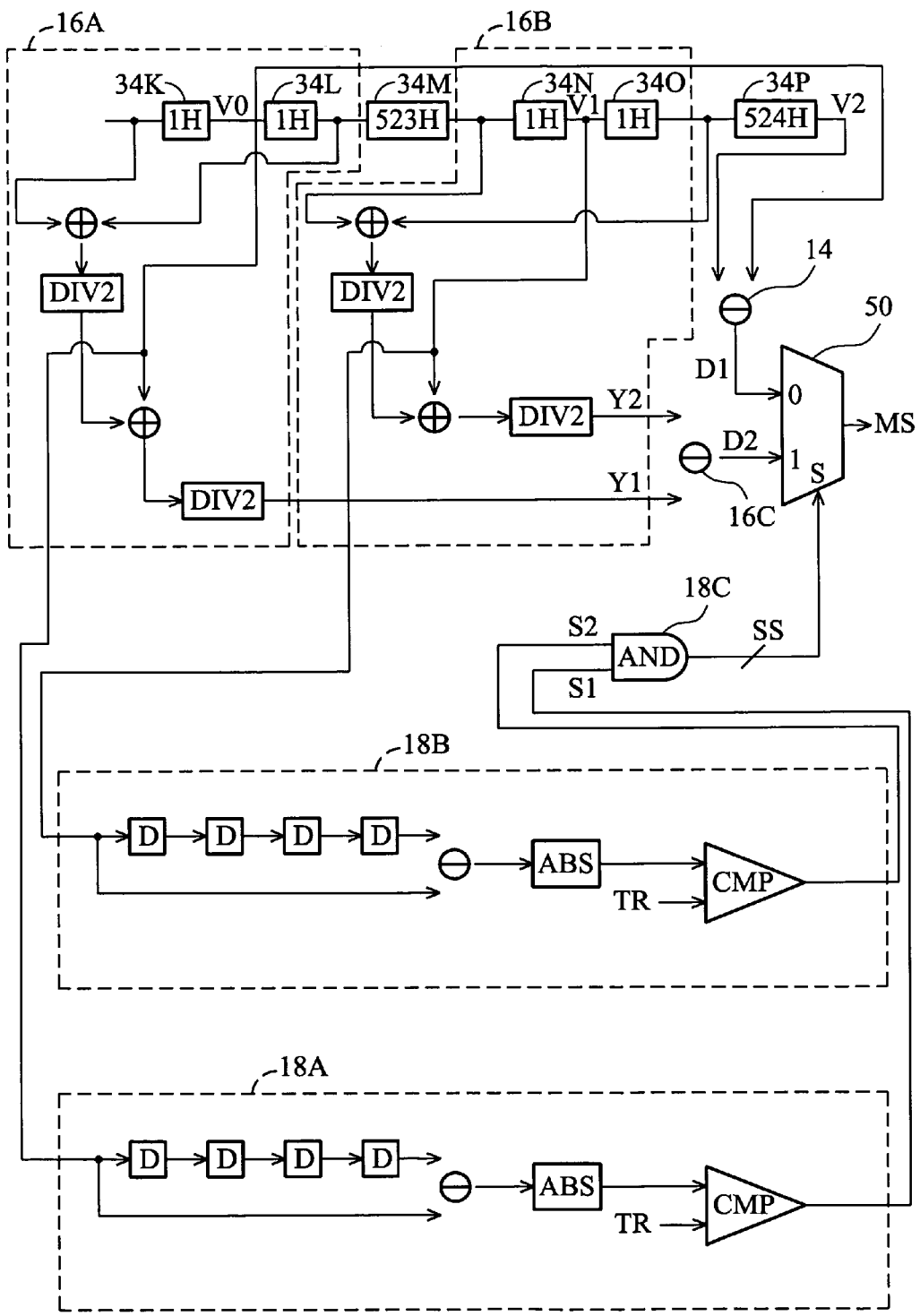

The movement detector 100I shown in FIG. 5F is similar to the movement detector 100H shown in FIG. 5E, with the exception of the smooth detection units 18A and 18B each being implemented by the smooth detection unit 18E shown in FIG. 3B.

Figure 5G:
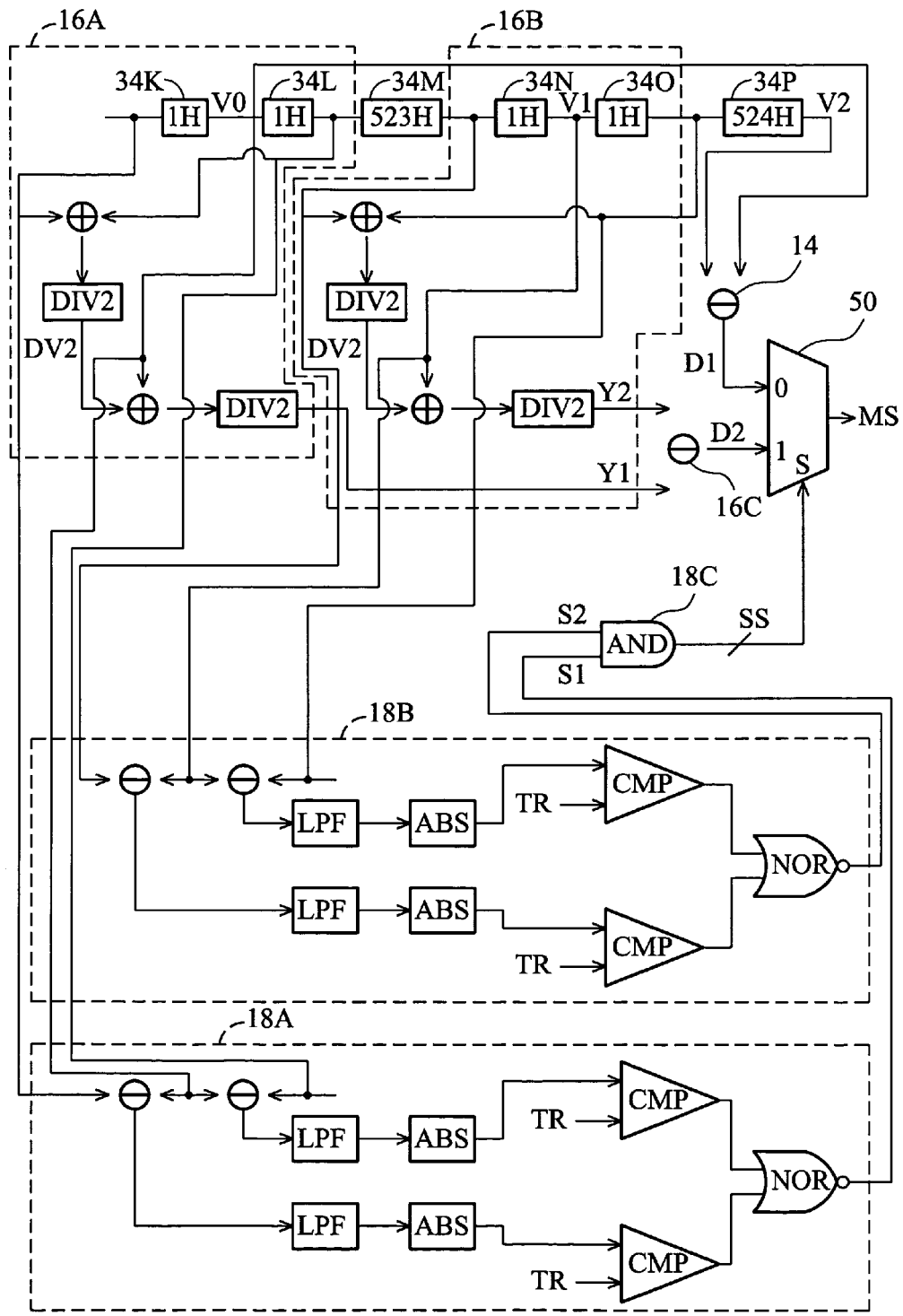

The movement detector 100J shown in FIG. 5G is similar to the movement detector 100H shown in FIG. 5E, with the exception of the smooth detection units 18A and 18B each being implemented by the smooth detection unit 18F shown in FIG. 3C. In this embodiment, the Y/C separator 16A and the smooth detection unit 18A further share the line delay elements 34K and 34K, and the Y/C separator 16B and the smooth detection unit 18B further share the line delay elements 34N and 34O.

Figure 5H:
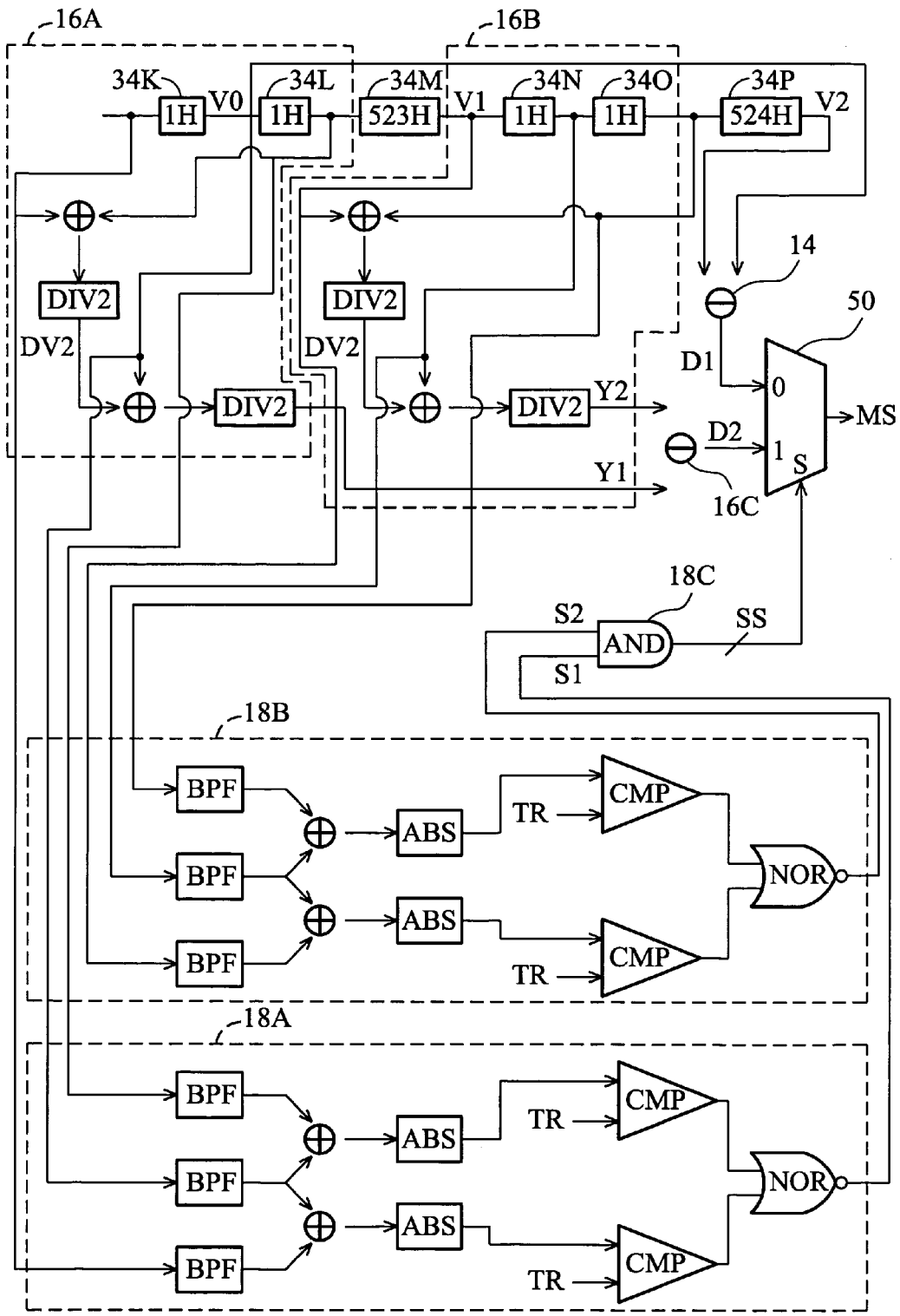

The movement detector 100K shown in FIG. 5H is similar to the movement detector 100J shown in FIG. 5G, with the exception of the smooth detection units 18A and 18B each being implemented by the smooth detection unit 18G shown in FIG. 3D. The Y/C separator 16A and the smooth detection unit 18A share the line delay elements 34K and 34K, and the Y/C separator 16B and the smooth detection unit 18B share the line delay elements 34N and 34O. The frame memory 12A and the Y/C separator 16A share the line delay element 34L, and the frame memory 12B and the Y/C separator 16B share the line delay element 34O. The operation of the components is similar to that disclosed, and description thereof is thus omitted for simplicity.

Because the invention utilizes a smoothness detection to determine the significance of the separated luminance and chrominance, the movement information is derived by in-phase TV signal difference of two frames when separated luminance and chrominance are not significant and is derived by the luminance difference or chrominance difference when the separated luminance and chrominance are significant.

Figure 6:
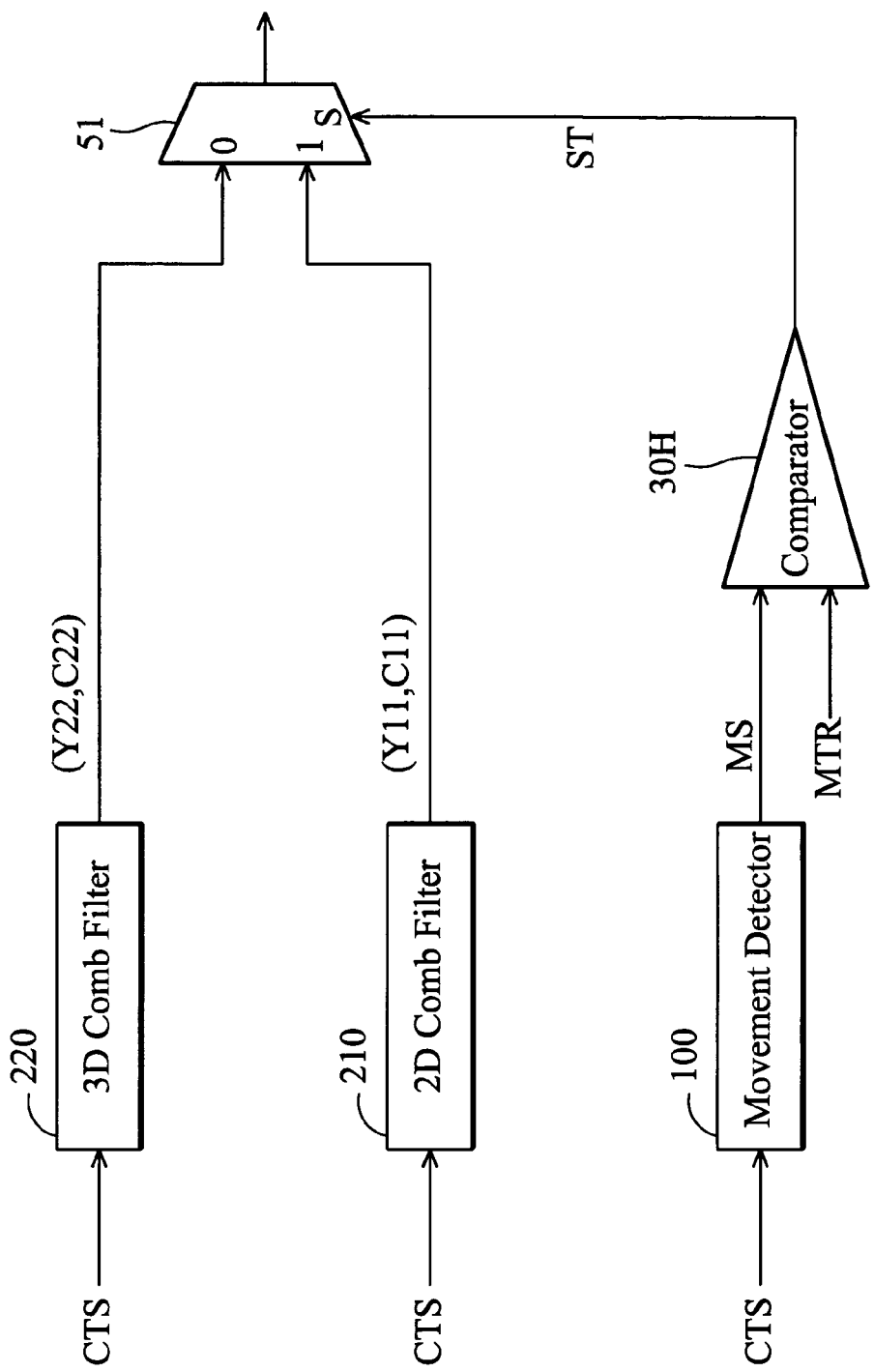
FIG. 6 shows an embodiment of a signal separation apparatus.

The invention also discloses a movement-adaptive Y/C separation apparatus for a composite television signal. As shown in FIG. 6, the separation apparatus 200 comprises a two dimensional (2D) filter 210, a three dimensional (3D) filter 220, the disclosed movement detector 100, a comparator 30H and a multiplexer 51.

The 2D comb filter 210 receives a composite television signal CTS and performs 2D Y/C separation to extract a first luminance signal Y11 and a first chrominance signal C11. The 3D comb filter 220 receives the composite television signal CTS and performs 2D Y/C separation to extract a second luminance signal Y22 and a second chrominance signal C22. The movement detector 100 generates a movement detection signal MS according to the composite television signal CTS, in which the movement detector 100 is similar to that shown in FIG. 1. The comparator 30H compares the movement signal MS with a threshold value MTR and outputs a selection signal ST according to the difference between the movement signal MS and the threshold value MTR. The multiplexer 51 selectively outputs the signals (Y11, C11) or the signals (Y22, C22) according to the selection signal ST.

For example, when the movement signal MS exceeds the threshold value MTR, the comparator 30H output a selection signal MS with a first voltage level such that the multiplexer 51 outputs the first luminance signal Y11 and the first chrominance signal C11. On the contrary, when the movement signal MS dose no exceed the threshold value MTR, the comparator 30H output a selection signal MS with a second voltage level such that the multiplexer 51 outputs the second luminance signal Y22 and the second chrominance signal C22.

Figure 7:
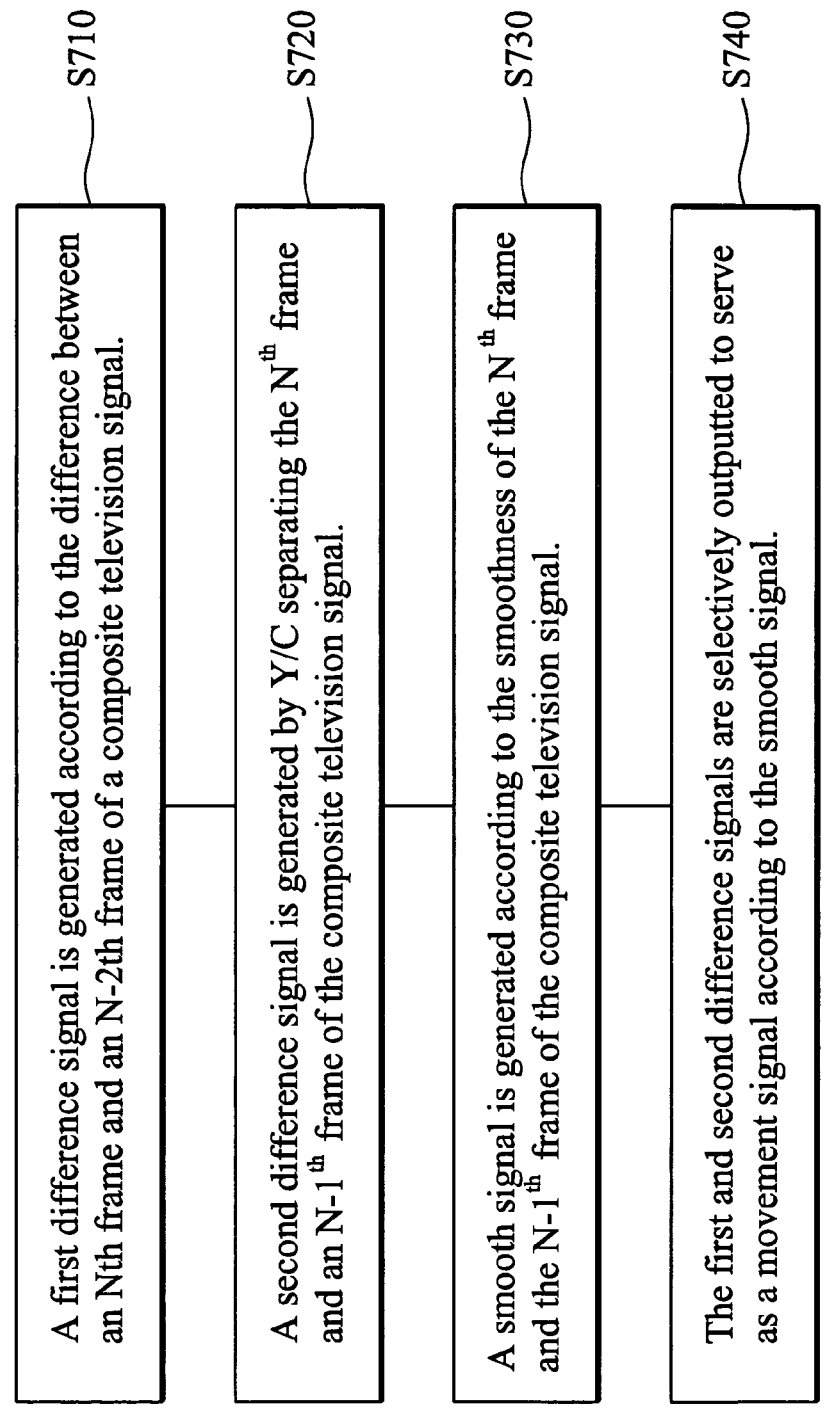
FIG. 7 is a flowchart of the method for detecting movement in a composite television signal.

FIG. 7 is a flowchart of a method for detecting movement in a composite television signal.

In step S710, a first difference signal D1 is generated according to the difference between an $N^{th}$ frame V0 and an $N-2^{th}$ frame V2 of a composite television signal. For example, the television signal can be a NTSC standard signal, and is converted into a digital signal of, for example, eight-bit width sampled by an A/D circuit at a sampling frequency (4fsc) four times that of the color subcarrier, and each frame V0-V2 comprises a plurality of samples. The first difference signal D1 can be generated, according to the difference between an $N^{th}$ frame V0 and the $N-2^{th}$ frame V2 of the received composite TV signal, by a subtractor.

In step S720, a second difference signal D2 is generated by Y/C separating the $N^{th}$ frame V0 and an $N-1^{th}$ frame V1 of the composite television signal. The second difference signal D2 can be generated, according to the $N^{th}$ frame V0 and the $N-1^{th}$ frame V1 of the received composite television signal, by a Y/C separation unit. For example, the Y/C separation unit can extract the chrominance signals from the $N^{th}$ frame V0 and an $N-1^{th}$ frame V1 of the composite television signal respectively, and the second difference signal D2 is generated according to the difference between the extracted chrominance signals.

Also, the Y/C separation unit can extract the luminance signals from the $N^{th}$ frame V0 and an $N-1^{th}$ frame V1 of the composite television signal respectively, and the second difference signal D2 is generated according to the difference between the extracted luminance signals. Alternately, the Y/C separation unit can extract both the chrominance signals and luminance signals from the $N^{th}$ frame V0 and an $N-1^{th}$ frame V1 of the composite television signal respectively. A third difference signal is generated according to the difference between the extracted chrominance signals, and a fourth difference signal is generated according to the difference between the extracted luminance signals. The higher of the third difference signal and the fourth difference signal is selected to serve as the second difference signal D2.

In step S730, a smooth signal is generated according to the smoothness of the $N^{th}$ frame and the $N-1^{th}$ frame of the composite television signal. A first detection signal S1 indicating the smoothness of the $N^{th}$ frame V0 of the composite television signal and a second detection signal S2 indicating the smoothness of the $N-1^{th}$ frame V1 are generated by two smooth detection units respectively.

For example, when the detection signal S1/S2 indicates that the smoothness of the $N^{th}/N-1^{th}$ frame V0/V1 of the received composite television signal is low, the correlation between samples in the frames V0 or V1 is also low. Thus, the separated luminance and chrominance are not significant, and a smooth signal SS with a first logic level is generated. On the contrary, when the detection signal S1/S2 indicates that the smoothness of the $N^{th}/N-1^{th}$ frame V0/V1 of the received composite television signal is high, the correlation between samples in the frames V0 or V1 is also high. Thus, the separated luminance and chrominance are significant, and a smooth signal SS with a second logic level is generated.

In step S740, the first and second difference signals D1 and D2 are selectively output to serve as a movement signal MS according to the smooth signal SS.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for detecting movement in a composite television signal, comprising:
    generating a first difference signal according to the difference between an $N^{th}$ frame and an $N-2^{th}$ frame of the composite television signal;
    generating a second difference signal by Y/C separating the $N^{th}$ frame and an $N-1^{th}$ frame of the composite television signal;
    generating a smooth signal according to the smoothness of the $N^{th}$ frame and the $N-1^{th}$ frame of the composite television signal; and
    outputting the first and second difference signals selectively according to the smooth signal.

2. The method as claimed in claim 1, wherein generation of the second difference signal comprises:
    extracting a first signal from the $N-1^{th}$ frame of the composite television signal by Y/C separation;
    extracting a second signal from the $N^{th}$ frame of the composite television signal by Y/C separation; and
    subtracting the second signal from the first signal to obtain the second difference signal.

3. The method as claimed in claim 2, wherein the first and second signals are luminance signals.

4. The method as claimed in claim 2, wherein the first and second signals are chrominance signals.

5. The method as claimed in claim 1, wherein generation of the second difference signal comprises:
    extracting a first luminance signal and a first chrominance signal from the $N-1^{th}$ frame of the composite television signal by Y/C separation;
    extracting a second luminance signal and a second chrominance signal from the $N^{th}$ frame of the composite television signal by Y/C separation;
    subtracting the second luminance signal from the first luminance signal to generate a third difference signal;
    subtracting the second chrominance signal from the first chrominance signal to generate a fourth difference signal; and
    outputting the third and fourth signals selectively to serve as the second difference signal.

6. The method as claimed in claim 1, wherein generation of the smooth signal comprises:
    detecting the smoothness of the $N-1^{th}$ frame of the composite television signal;
    detecting the smoothness of the $N^{th}$ frame of the composite television signal; and
    outputting, the smooth signal indicating that the movement is smooth if both the smoothness of the $N-1^{th}$ and $N^{th}$ frames of the composite television signal are smooth.

7. The method as claimed in claim 1, wherein the smooth signal is generated based on a correlation of the $N^{th}$ frame and the $N-1^{th}$ frame of the composite television signal.

8. The method as claimed in claim 1, wherein the first difference signal is selected if the smooth signal indicating the composite television signal is not smooth, and the second difference signal is selected if the smooth signal indicating the composite television signal is smooth.

9. A movement detector, comprising:
    serially-connected first and second frame memories storing a composite television signal frame-by-frame and outputting an $N-1^{th}$ frame and an $N-2^{th}$ frame of the composite television signal respectively;
    means for generating a first difference signal according to the difference between an $N^{th}$ frame and the $N-2^{th}$ frame of the composite television signal;
    a Y/C separation unit generating a second difference signal according to the $N^{th}$ frame and the $N-1^{th}$ frame of the composite television signal;
    a smooth detector generating a smooth signal according to the $N^{th}$ frame and the $N-1^{th}$ frame of the composite television signal; and
    a selection unit outputting the first difference signal or the second difference signal according to the smooth signal.

10. The detector as claimed in claim 9, wherein the Y/C separation unit comprises:
    a first Y/C separator extracting a first signal from the $N-1^{th}$ frame of the composite television signal;

a second Y/C separator extracting a second signal from the $N^{th}$ frame of the composite television signal; and means for generating the second difference signal according to the first signal and the second signal.

11. The detector as claimed in claim 10, wherein the first and second signals are luminance signals.

12. The detector as claimed in claim 10, wherein the first and second signals are chrominance signals.

13. The detector as claimed in claim 9, wherein the Y/C separation unit comprises:

a first Y/C separator extracting a first luminance signal and a first chrominance signal from the $N-1^{th}$ frame of the composite television signal;

a second Y/C separator extracting a second luminance signal and a second chrominance signal from the $N^{th}$ frame of the composite television signal; and a first subtractor generating a third difference signal according to the first luminance signal and the second luminance signal;

a second subtractor generating a fourth difference signal according to the first chrominance signal and the second chrominance signal; and a selector outputting the third and fourth difference signals selectively to serve as the second difference signal.

14. The detector as claimed in claim 9, wherein the smooth detector comprises:

a first smooth detection unit generating a first detection signal indicating the smoothness of the $N-1^{th}$ frame of the composite television signal;

a second smooth detection unit generating a second detection signal indicating the smoothness of the $N^{th}$ frame of the composite television signal; and means for outputting the smooth signal according to the first detection signal and the second detection signal.

15. The detector as claimed in claim 9, wherein the means for generating the first difference signal comprises a subtractor, and the selection unit comprises a multiplexer.

16. The detector as claimed in claim 9, wherein the Y/C separation unit comprises:

two Y/C separators coupled to the $N^{th}$ and $N-1^{th}$ frames of the composite television signal respectively, each comprising:

a band-pass filtering unit filtering the $N^{th}/N-1^{th}$ frame of the composite television signal to obtain a first separated signal; and a first subtractor subtracting the first separated signal from the $N^{th}/N-1^{th}$ frame of the composite television signal to obtain a second separated signal; and a second subtractor coupled to the two Y/C separating unit to generate the second difference signal according to the first separated signals or the second separated signals.

17. The detector as claimed in claim 16, wherein the first separated signals are chrominance signals and the second separated signals are luminance signals.

18. The detector as claimed in claim 9, wherein the Y/C separation unit comprises:

two Y/C separators coupled to the $N^{th}$ and $N-1^{th}$ frames of the composite television signal respectively, each comprising:

two serially-connected line delays, delaying the $N^{th}/N-1^{th}$ frame of the composite television signal line by line and outputting a first delay signal and a second delay signal;

a first adder adding the first delay signal to the $N^{th}/N-1^{th}$ frame of the composite television signal line to obtain a first signal;

a division unit dividing the first signal by 2 to obtain a second signal;

a second adder adding the second delay signal to the second signal to obtain a separated luminance signal; and a first subtractor subtracting the second delay signal from the second signal to obtain a separated chrominance signal; and a second subtractor coupled to the two Y/C separating unit to generate the second difference signal according to the separated luminance signals or the separated chrominance signals.

19. The detector as claimed in claim 9, wherein the smooth detector comprises:

two smooth detection units coupled to the $N^{th}$ and $N-1^{th}$ frames of the composite television signal respectively, each comprising:

four serially-connected pixel delays, delaying the $N^{th}/N-1^{th}$ frame of the composite television signal pixel by pixel and outputting a first delay signal, a second delay signal, a third delay signal and a fourth delay signal;

an addition unit adding the second delay signal to the $N^{th}/N-1^{th}$ frame of the composite television signal to obtain a first signal, adding the first delay signal to the second delay signal to obtain a second signal and adding the second delay signal to the fourth delay signal to obtain a third signal;

a subtraction unit subtracting the second signal from the first signal to obtain a third difference signal and subtracting the second signal from the third signal to obtain a fourth difference signal;

an absolute value generation unit generating a first level value and a second level value according to the third difference signal and the fourth difference signal respectively;

a comparison unit comparing the first level value and the second level value with a threshold value to output a two comparison signals; and a NOR gate generating a detection signal according to the two comparison signals; and an AND gate generating the smooth signal according to the detection signals.

20. The detector as claimed in claim 19, wherein the addition unit comprises three adders, the subtraction unit comprises two subtractors, the absolute value generation unit comprises two absolute value circuits and the comparison unit comprises two comparators.

21. The detector as claimed in claim 19, wherein the first, the second and the third signals are luminance signals.

22. The detector as claimed in claim 9, wherein the smooth detector comprises:

two smooth detection units coupled to the $N^{th}$ and $N-1^{th}$ frames of the composite television signal respectively, each comprising:

a delay unit, delaying the $N^{th}/N-1^{th}$ frame of the composite television signal for four pixels and outputting a first delay signal;

a subtraction unit subtracting the first delay signal from the $N^{th}/N-1^{th}$ frame of the composite television signal to obtain a third difference signal;

an absolute value generation unit generating a level value according to the third difference signal; and a comparison unit comparing the level value with a threshold value to output a detection signal; and an AND gate generating the smooth signal according to the detection signals.

23. The detector as claimed in claim 22, wherein the delay unit comprises four series-connected pixel delay, the subtraction unit comprises a subtractor, the absolute value generation unit comprises an absolute value circuit and the comparison unit comprises a comparator.

24. The detector as claimed in claim 9, wherein the smooth detector comprises:
   two smooth detection units coupled to the $N^{th}$ and $N-1^{th}$ frames of the composite television signal respectively, each comprising:
      two serially-connected line delays, delaying the $N^{th}/N-1^{th}$ frame of the composite television signal line by line and outputting a first delay signal and a second delay signal;
      a subtraction unit subtracting the first delay signal from the $N^{th}/N-1^{th}$ frame of the composite television signal to obtain a first signal and subtracting the second delay signal from the first delay signal to obtain a second signal;
      a low-pass filtering unit to filtering the first signal and the second signal respectively to obtain a first separated signal and a second separated signal;
      an absolute value generation unit generating a first level value and a second level value according to the first separated signal and the second separated signal;
      a comparison unit comparing the first level value and the second level value with a threshold value to output two comparison signals; and
      a NOR gate generating a detection signal according to the two comparison signals; and
   an AND gate generating the smooth signal according to the detection signals.

25. The detector as claimed in claim 24, wherein the subtraction unit comprises two subtractors, the low-pass filtering unit comprises two low-pass filters, the absolute value generation unit comprises two absolute value circuits and the comparison unit comprises two comparators.

26. The detector as claimed in claim 24, wherein the first and second separated signals are luminance signals.

27. The detector as claimed in claim 9, wherein the smooth detector comprises:
   two smooth detection units coupled to the $N^{th}$ and $N-1^{th}$ frames of the composite television signal respectively, each comprising:
      two serially-connected line delays, delaying the $N^{th}/N-1^{th}$ frame of the composite television signal line by line and outputting a first delay signal and a second delay signal;
      a band-pass filtering unit to filtering the first signal, the second signal and the $N^{th}/N-1^{th}$ frame of the composite television signal respectively to obtain a first separated signal, a second separated signal and a third separated signal;
      an addition unit adding the first separated signal to the second separated signal to obtain a third difference signal and adding the second separated signal to the third separated signal to obtain a fourth difference signal;
      an absolute value generation unit generating a first level value and a second level value according to the third difference signal and the fourth difference signal;
      a comparison unit comparing the first level value and the second level value with a threshold value to output two comparison signals; and
      a NOR gate generating a detection signal according to the two comparison signals; and
   an AND gate generating the smooth signal according to the detection signals.

28. The detector as claimed in claim 27, wherein the addition unit comprises two adders, the band-pass filtering unit comprises three low-pass filters, the absolute value generation unit comprises two absolute value circuits and the comparison unit comprises two comparators.

29. The detector as claimed in claim 27, wherein the first, the second and the third separated signals are chrominance signals.

30. A signal separation apparatus for a composite television signal, comprising:
   a two dimensional (2D) comb filter receiving a composite television signal and outputting a first luminance signal and a first chrominance signal;
   a three dimensional (3D) comb filter receiving the composite television signal and outputting a second luminance signal and a second chrominance signal;
   a movement detector generating a movement detection signal according to the composite television signal, and comprising:
      serially-connected first and second frame delays, delaying the composite television signal frame by frame and outputting $N-1^{th}$ and $N-2^{th}$ frames of the composite television signal respectively;
      means for generating a first difference signal according to an $N^{th}$ frame and the $N-1^{th}$ frame of the composite television signal;
      a Y/C separation unit generating a second difference signal according to the $N^{th}$ frame and the $N-1^{th}$ frame of the composite television signal;
      a smooth detector generating a smooth signal according to the $N^{th}$ frame and the $N-1^{th}$ frame of the composite television signal; and
      a selection unit outputting the first difference signal or the second difference signal to serve as the movement detection signal, according to the smooth signal; and
   a multiplexer, selecting the output of the 3D comb filter or the 2D comb filter according to the movement detection signal generated by the movement detector.

31. The apparatus as claimed in claim 30, wherein the multiplexer selects the output of the 2D comb filter if the movement detection signal indicating a rapid movement.

* * * * *